United States Patent
Zimmerman et al.

(10) Patent No.: US 10,406,390 B2
(45) Date of Patent: Sep. 10, 2019

(54) AERIAL FIRE SUPPRESSION SYSTEM

(71) Applicant: Simplex Manufacturing Co., Portland, OR (US)

(72) Inventors: Mark D. Zimmerman, Kalama, WA (US); David M. Kruithoff, Vancouver, WA (US)

(73) Assignee: Simplex Manufacturing Co., Portland, OR (US)

( * ) Notice: Subject to any disclaimer, the term of this patent is extended or adjusted under 35 U.S.C. 154(b) by 233 days.

(21) Appl. No.: 15/232,609

(22) Filed: Aug. 9, 2016

(65) Prior Publication Data
US 2018/0043194 A1   Feb. 15, 2018

(51) Int. Cl.
A62C 3/02 (2006.01)
A62C 5/02 (2006.01)
B64D 1/18 (2006.01)

(52) U.S. Cl.
CPC ............ *A62C 3/0242* (2013.01); *A62C 5/022* (2013.01); *B64D 1/18* (2013.01)

(58) Field of Classification Search
CPC ........... A62C 5/002; A62C 5/02; A62C 5/022; A62C 5/027; B64D 1/16; B64D 1/18
USPC .............................................. 169/13, 53, 62
See application file for complete search history.

(56) References Cited

U.S. PATENT DOCUMENTS

| | | |
|---|---|---|
| 2,198,585 A | 4/1940 | Urquhart et al. |
| 2,249,095 A | 7/1941 | Swift et al. |
| 2,961,050 A | 11/1960 | MacCracken |
| 3,220,482 A | 11/1965 | Eveleth |
| 3,234,962 A | 2/1966 | Williamson |
| 3,273,651 A | 9/1966 | Andrews |
| 3,424,250 A | 1/1969 | Thomae |

(Continued)

FOREIGN PATENT DOCUMENTS

| | | |
|---|---|---|
| AU | 2006292025 C1 | 3/2007 |
| AU | 2006319757 B2 | 6/2007 |

(Continued)

OTHER PUBLICATIONS

Guden, Ai. Machine Design, "Properly specify and install gas springs for long-term lifting help", Feb. 17, 2009 (8 pages).

(Continued)

*Primary Examiner* — Jason J Boeckmann
(74) *Attorney, Agent, or Firm* — Neal, Gerber & Eisenberg LLP; Thomas E. Williams

(57) ABSTRACT

An embodiment of a fire suppression apparatus for fighting fires from an aerial vehicle is disclosed having a foam and water held in separate containers that when mixed forms a fire retardant in the separate water container, a pump driven by a first electric motor, the pump including an air induction valve positioned at the pump inlet where air and the fire retardant are drawn into the inlet and pressurized simultaneously by the pump, a primer pump driven by a second electric motor to prime the inlet with the fire retardant before starting the pump, an inverter to control startup of the first electric motor, and an aimable boom connected to the pump by a conduit, the boom including a nozzle on a distal end of the boom from which the pressurized water/foam/air fire retardant is dispensed toward a target. Vertical mount plates can attach the apparatus to opposite sides of the helicopter.

17 Claims, 18 Drawing Sheets

(56) References Cited

U.S. PATENT DOCUMENTS

| | | | |
|---|---|---|---|
| 3,438,445 A | 4/1969 | MacCracken | |
| 3,510,107 A | 5/1970 | Fidler | |
| 3,580,339 A | 5/1971 | Nance | |
| 3,581,504 A | 6/1971 | Andrus | |
| 3,714,987 A | 2/1973 | Mattson | |
| 3,754,601 A | 8/1973 | Linkewich | |
| 3,759,330 A | 9/1973 | Rainey et al. | |
| 3,846,515 A | 11/1974 | Williamson | |
| 3,897,829 A | 8/1975 | Eason | |
| 3,977,474 A | 8/1976 | Boegli | |
| 4,090,567 A | 5/1978 | Tomlinson | |
| 4,390,069 A | 6/1983 | Rose, Jr. | |
| 4,477,289 A | 10/1984 | Kurtgis | |
| 4,589,614 A | 5/1986 | Stevens | |
| 4,614,237 A | 9/1986 | Colodner et al. | |
| 4,633,895 A | 1/1987 | Eberhardt | |
| 4,662,454 A | 5/1987 | Uchlyama et al. | |
| 4,669,548 A | 6/1987 | Colodner et al. | |
| 4,729,434 A | 3/1988 | Rohrbach | |
| 4,828,038 A | 5/1989 | Williams | |
| 4,979,571 A | 12/1990 | MacDonald | |
| 4,981,178 A | 1/1991 | Bundy | |
| 4,993,665 A | 2/1991 | Sparling | |
| 5,009,244 A * | 4/1991 | Grindley | A62C 5/02 |
| | | | 137/101.11 |
| 5,086,846 A | 2/1992 | Carlson | |
| 5,125,458 A * | 6/1992 | Berman | A62C 37/36 |
| | | | 169/13 |
| 5,135,055 A | 8/1992 | Bisson | |
| 5,137,233 A | 8/1992 | Maimon et al. | |
| 5,174,383 A | 12/1992 | Haugen et al. | |
| 5,248,436 A | 9/1993 | Kovaletz | |
| 5,385,208 A | 1/1995 | Baker et al. | |
| 5,411,100 A | 5/1995 | Laskaris et al. | |
| 5,477,672 A | 12/1995 | Tsujkado et al. | |
| 5,549,259 A | 8/1996 | Herlik | |
| 5,575,341 A | 11/1996 | Baker et al. | |
| 5,607,020 A | 3/1997 | Gebhardt | |
| 5,623,995 A | 4/1997 | Smagac | |
| 5,632,338 A | 5/1997 | Hunter | |
| 5,648,052 A | 7/1997 | Schaefer et al. | |
| 5,699,862 A | 12/1997 | Rey | |
| 5,823,219 A | 10/1998 | Purvis et al. | |
| 5,904,165 A | 5/1999 | McClean et al. | |
| 5,927,648 A | 7/1999 | Woodland | |
| 6,003,782 A | 12/1999 | Kim et al. | |
| 6,009,953 A | 1/2000 | Laskaris et al. | |
| 6,089,324 A | 7/2000 | Mahrt | |
| 6,109,359 A | 8/2000 | Ballard | |
| 6,138,994 A | 10/2000 | Rowe | |
| 6,217,009 B1 | 4/2001 | Rowe | |
| 6,267,183 B1 | 7/2001 | Smagac | |
| 6,276,459 B1 | 8/2001 | Herrick et al. | |
| 6,311,780 B1 | 11/2001 | Zuev et al. | |
| 6,357,532 B1 | 3/2002 | Laskaris et al. | |
| 6,371,384 B1 | 4/2002 | Garcia | |
| 6,454,540 B1 | 9/2002 | Terefinko et al. | |
| 6,543,547 B2 | 4/2003 | Neumeir et al. | |
| 6,571,882 B2 | 6/2003 | Yen | |
| 6,588,199 B2 | 7/2003 | Stechman, Jr. et al. | |
| 6,634,433 B2 | 10/2003 | Kim et al. | |
| 6,644,595 B2 | 11/2003 | Ramage et al. | |
| 6,684,959 B1 | 2/2004 | Juidici et al. | |
| 6,688,402 B1 | 2/2004 | Wise | |
| 6,725,940 B1 | 4/2004 | Klein et al. | |
| 6,733,004 B2 | 5/2004 | Crawley | |
| 6,766,638 B1 | 7/2004 | Tilston et al. | |
| 6,874,734 B2 | 4/2005 | Ramage et al. | |
| 6,887,821 B2 | 5/2005 | Mays et al. | |
| 6,889,773 B2 | 5/2005 | Hanratty | |
| 6,889,776 B2 | 5/2005 | Cheung | |
| 6,973,975 B1 | 12/2005 | Adamson et al. | |
| 6,991,041 B2 | 1/2006 | Laskaris et al. | |
| 7,021,391 B2 | 4/2006 | Schasteen | |
| 7,055,615 B2 | 6/2006 | Dillman | |
| 7,165,627 B2 | 1/2007 | Hutter et al. | |
| 7,207,501 B2 | 4/2007 | Hanratty | |
| 7,458,427 B2 | 12/2008 | Braun et al. | |
| 7,513,315 B2 | 4/2009 | Boyle et al. | |
| 7,530,404 B2 | 5/2009 | Lenz, Jr. | |
| 8,096,323 B2 | 1/2012 | Von Mohos | |
| 8,297,369 B2 * | 10/2012 | Gamble | G05B 11/06 |
| | | | 169/14 |
| 9,333,379 B2 | 6/2016 | Zimmerman et al. | |
| 9,981,150 B2 | 5/2018 | Zimmerman et al. | |
| 2004/0069505 A1 | 4/2004 | Griffin | |
| 2004/0069865 A1 | 4/2004 | Rowe et al. | |
| 2005/0222287 A1 | 10/2005 | Roberts | |
| 2006/0175429 A1 * | 8/2006 | Lanigan | B64D 1/16 |
| | | | 239/171 |
| 2007/0110917 A1 | 5/2007 | Okada | |
| 2007/0209807 A1 | 9/2007 | Kruger et al. | |
| 2009/0146010 A1 | 6/2009 | Cohen | |
| 2010/0038098 A1 | 2/2010 | Groonwald et al. | |
| 2010/0065286 A1 * | 3/2010 | Hosfield | A62C 27/00 |
| | | | 169/13 |
| 2010/0116512 A1 | 5/2010 | Henry | |
| 2010/0126738 A1 | 5/2010 | Kruger et al. | |
| 2010/0175897 A1 | 7/2010 | Crump | |
| 2010/0176961 A1 | 7/2010 | Nelson | |
| 2010/0178176 A1 | 7/2010 | Kenyon et al. | |
| 2011/0042108 A1 | 2/2011 | Hiebert | |
| 2011/0127051 A1 | 6/2011 | Guse | |
| 2011/0168414 A1 | 7/2011 | Nelson | |
| 2012/0000680 A1 | 1/2012 | Guse | |
| 2013/0056230 A1 | 3/2013 | Lemke et al. | |
| 2013/0199806 A1 * | 8/2013 | Zimmerman | A62C 3/0242 |
| | | | 169/53 |
| 2014/0060309 A1 * | 3/2014 | Deckard | B64D 7/06 |
| | | | 89/136 |
| 2018/0243595 A1 | 8/2018 | Zimmerman et al. | |

FOREIGN PATENT DOCUMENTS

| | | |
|---|---|---|
| CA | 2289617 | 11/1998 |
| CA | 2328972 | 10/1999 |
| CA | 2565290 | 1/2006 |
| CN | 1525873 A | 9/2004 |
| CN | 201770004 | 3/2011 |
| CN | 102058943 | 5/2011 |
| EP | 1419310 B1 | 7/2007 |
| FR | 1481100 | 5/1967 |
| FR | 2959724 | 11/2011 |
| GB | 2246294 A | 1/1992 |
| JP | 198901151468 | 6/1989 |
| JP | 2119881 | 5/1990 |
| JP | 2007319281 A | 12/2007 |
| RU | 2290237 | 12/2006 |
| WO | WO9423798 | 10/1994 |
| WO | WO9426353 | 11/1994 |
| WO | WO2007062477 | 6/2007 |
| WO | WO2007132454 | 2/2009 |
| WO | WO2009/100541 | 8/2009 |
| WO | WO2010081046 | 7/2010 |
| WO | WO2011154325 | 12/2011 |
| WO | WO2013112896 | 8/2013 |

OTHER PUBLICATIONS

Peerless Pump Company, Technical Information Bulletin No. Ten, "Pump Inducers", Jul. 2006 (5 pages).

Bloch, Heinz P. Soares, Claire. (1998). Process Plant Machinery (2nd Edition)—7.3 High-Speed Centrifugal Pumps. Elsevier. Online version available at: http://app.knovel.com/hotlink/pdf/id:ktOOC1 CV13/process-plant-machinery/high-speedcentrifugal (10 pages).

International Search Report and Written Opinion dated May 23, 2013 for PCT Application No. PCT/US2013/023234 (15 pages).

International Search Report and Written Opinion dated Jun. 2, 2009 for PCT Application No. PCT/CA2009/000187 (9 pages).

Wernimont, et al. Past and Present Uses of Rocket Grade Hydrogen Peroxide. [online]. Undated but believed posted online at least as early as Oct. 7, 2007. Retrieved from the Internet <URL: http://

(56) References Cited

OTHER PUBLICATIONS workingthroughthebooklog.wordpress.com/2007/10/07/past-and-present-uses-of-rocket-grade-hydrogen-peroxide/>. (15 pages).
Keese et al. Hydrogen Peroxide-Based Propulsion and Power Systems. [online]. Published Apr. 2004. Retrieved from the Internet <URL: http://hydrogen-peroxide.us/uses-biprop-combustion/Sandia-Hydrogen_Peroxide-Based_Propulsion_and_Power_Systems-2004.pdf>. (22 pages).
Aerial-firefighting. Web page [online]. [retrieved on Feb. 8, 2010] Retrieved from the Internet <URL: http://en.wikipedia.org/wiki/Aerial-firefighting>. (4 pages).
Hydrogen peroxide. Web page [online]. [retrieved on Feb. 8, 2010] Retrieved from the Internet <URL: http://en.wikipedia.org/wiki/Hydrogen_peroxide>. (17 pages).
Compressed air foam system. Web page [online]. [retrieved on Feb. 8, 2010] Retrieved from the Internet <URL: http://en.wikipedia.org/wiki/Compressed_Air_Foam_System>. (7 pages).
Can you make a rocket engine using hyd. Per. and silver? [online]. [retrieved on Feb. 8, 2010] Retrieved from the Internet <URL: http://science.howstuffworks.com/question159.htm>. (3 pages).
HTP Rocket Motors. Web page [online]. [retrieved on Feb. 8, 2010] Retrieved from the Internet <URL: http://www.spaceuk.org/htp/htp.htm>. (14 pages).
TAM Rocket Racing Vehicles. Web page [online]. [retrieved on Feb. 8, 2010] Retrieved from the Internet <URL: http://www.tecaeromex.com/ingles/indexi.html>. (2 pages).
Porta-CAFS Compressed Air Foam System. Web page [online]. [retrieved on Feb. 8, 2010] Retrieved from the Internet <URL: http://www.firematic.com/portacafs.htm>. (2 pages).
Porta-CAFS Portable Compressed Air Foam Systems, Foamblower, CAFS, Foam, etc. Web page [online]. [retrieved on Feb. 8, 2010] Retrieved from the Internet <URL: http://portacafs.com/>. (2 pages).
Snuffer ISO 9001 Certified FAQ About Compressed Air Foam Systems (CAFS). The Snuffer Corporation. [online] Retrieved from the Internet <http://snuffer.com/Information/PDF/FAQ.pdf>. (3 pages).
Our New Application is Equipped with CAFS. Web page [online]. [retrieved on Feb. 8, 2010] Retrieved from the Internet <URL: http://www.rollestonfire.co.nz/cafs.htm>. (3 pages).
Porta-cafs Hughes Fire Equipment. Web page [online]. [retrieved on Feb. 8, 2010] Retrieved from the Internet <URL: http://www.hughesfire.com/home/hf1/smartlist_11/Porta-Cafs>. (5 pages).
Class 1—Welcome to Class 1. Web page [online]. [retrieved on Feb. 8, 2010] Retrieved from the Internet <URL: http://www.class1.com/Main/Content.aspx>. (2 pages).
Rosenbauer CAFS Compressed Air Foam System. Rosenbauer International. Dated May 2005. [online] [retrieved from the Internet <http://www.rosenbauer.com>. (6 pages).
Welcome to Simplex Manufacturing. Web page [online]. [retrieved on Feb. 8, 2010] Retrieved from the Internet <URL: http://www.simplexmfg.net/>. (3 pages).
Associated Airtanker Pilots Air Tanker Association Home page. Web page [online]. [retrieved on Feb. 8, 2010] Retrieved from the Internet <URL: http://www.airtanker.org/>. (3 pages).
Aeropower—Electrical Insulator Washing. Web page [online]. [retrieved on Feb. 3, 2012] Retrieved from the Internet <URL:http://www.aeropower.com.au/electrical/services/liveLine/insulatorWashing.htm>. (1 page).
Iframe. Web page [online]. [retrieved on Feb. 3, 2012] Retrieved from the Internet <URL: http://www.aerosud.co.za/products/ancillary.htm>. (1 page).
Uashome1. Web page [online]. [retrieved on Feb. 3, 2012] Retrieved from the Internet <URL: http://www.usaairmobile.com/insulator.htm>. (1 page).
Haverfield Corporation. Web page [online]. [retrieved on Feb. 3, 2012] Retrieved from the Internet <URL: http://www.haverfield.com/services_energizedinsulator.html>. (1 page).
International Preliminary Report on Patentability dated Jul. 29, 2014 for International Application No. PCT/US2013/023234 (9 pages).
Chinese Office action dated Jun. 3, 2015 for Chinese Patent Application No. 201380006835.1 (12 pages).
European Search Report dated Jan. 27, 2016 for European Patent Application No. 13741238.3 (11 pages).
International Search Report and Written Opinion dated Dec. 15, 2016 for PCT Application No. PCT/US2016/046191 (24 pages).
International Preliminary Report on Patentability dated Feb. 12, 2019 for PCT Application No. PCT/US2016/046191 (10 pages).
State Intellectual Property Office of the People's Republic of China, First Office Action in Chinese Patent Application No. 201611001741.7 (dated Apr. 17, 2019) (21 Pages).

* cited by examiner

AERIAL FIRE SUPPRESSION SYSTEM

BACKGROUND

This application relates generally to systems for dispensing liquids from an aerial vehicle, and particularly to fire suppression systems usable in connection with aerial vehicles, such as fixed wing aircraft and rotorcraft.

The design and implementation of firefighting systems for use in aerial vehicles is a difficult endeavor at least because aerial vehicles, such as fixed wing aircraft and rotorcraft (i.e., helicopters), have limited volume and payload capability, and because such systems are subject to rigorous government certification requirements to protect the safety of those flying on such vehicles as well as to protect people and property on the ground. Thus, aerial firefighting systems should be relatively small and lightweight, simple and safe to operate, with minimum impediments to government certification, while providing the longest possible endurance and the best possible effectiveness at a fire location.

Compressed Air Foam Systems (CAFS) are known in the firefighting industry for fighting fires from vehicles and platforms on the ground. Such systems include the use of a foaming agent that when combined or mixed with water, enhances the fire suppression capability of water alone. For example, when dispensed onto a fire, a water/foam mixture compared to water alone has the advantage of adhering to horizontal and vertical surfaces of a structure for long duration fire retardancy, acting as a surfactant thereby preventing re-ignition of the fire, in the case of a multi-story building, limiting water damage to the floors below the fire, and magnifying the fire suppression qualities of water by up to seven times.

Known CAFS systems for ground-based vehicles and firefighting platforms may include compressed air or inert gas injected into the water/foam mixture to aerate the water/foam mixture and to eject the water/foam mixture from a nozzle at relatively high velocities toward a relatively distant target. Compressed air or inert gas for this purpose is usually provided in the form of pressurized tanks or bottles or by one or more mechanical air compressors.

However, use of pressurized tanks or bottles or air compressors as a source for pressurized air can consume valuable space and energy resources on an airborne vehicle, are relatively heavy thereby reducing the payload available for consumable fluids such as water, foam, and fuel, and increase the risk of accidents due to the hazards associated with pressurized systems. In addition, pressurized tanks must be attached securely to an airframe, which may lengthen turnaround times when replacing depleted air tanks. Moreover, structural and weight limitations prevent pressurization of one or more water tanks carried aboard aircraft or rotorcraft where pressurized water tanks would otherwise be usable for propelling water or a water/foam mixture toward a distant target.

What is needed is a firefighting system configured for use in aerial vehicles, which overcomes the aforementioned limitations of existing CAFS systems.

SUMMARY

An embodiment of a fire suppression apparatus for fighting fires from a helicopter is disclosed including: (a) a tank assembly configured for attachment to an underside of the helicopter, comprising (i) a foam tank for housing a foam, (ii) a water tank located downstream of the foam tank for housing water, wherein the water tank is configured to receive a foam from the foam tank that when mixed with water in the water tank forms a liquid fire retardant in the water tank, and (iii) a tank assembly housing that encloses the foam tank and the water tank; (b) a powerpack configured for attachment to a side of the helicopter, comprising (i) a liquid fire retardant pump configured to pump the liquid fire retardant comprising the foam and water, the liquid fire retardant pump driven by a first electric motor, the liquid fire retardant pump including a pump inlet and an air induction valve positioned at the pump inlet, the air induction valve including an electrically variable valve opening, wherein air and the liquid fire retardant are drawn together into the pump inlet and pressurized by the liquid fire retardant pump to form a pressurized water/foam/air fire retardant solution; (ii) a liquid primer pump driven by a second electric motor, the liquid primer pump configured to prime the pump inlet with the liquid fire retardant from the water tank; (iii) an inverter connected to the first electric motor, the inverter configured to slowly and controllably start the first electric motor to minimize startup current draw by the first electric motor; and (c) a cannon assembly configured for attachment to an opposite side of the helicopter, comprising an aimable boom connected to the liquid fire retardant pump by a conduit, the boom including a nozzle on a distal end of the boom from which the pressurized water/foam/air fire retardant solution is dispensed toward a target.

The liquid fire retardant pump and the liquid primer pump may each be supported on a flat upper surface of a horizontal base. The powerpack and the cannon assembly may each be supported by a pair of brackets cantileverly extending from respective vertical mount plates that are each attachable on opposite sides of a fuselage of the helicopter. Each vertical mount plate may be configured to attach to structural hardpoints located on an exterior surface of the helicopter. The vertical mount plate may be configured to directly attach to a pair of upper structural hardpoints of the helicopter fuselage and to attach to a pair of lower structural hardpoints of the helicopter fuselage via a pair of adjustable length connecting members that extend from the vertical mount plate to the lower structural hardpoints. The pair of adjustable length connecting members may include a clevis on each opposing end of the connecting members for directly attaching the vertical mount plate to a pair of structural hardpoints of the helicopter.

The fire suppression apparatus may include a ball valve positioned downstream and adjacent a discharge opening of the liquid fire retardant pump. The air induction valve may include an inlet that directly receives unpressurized ambient air. A primer pump discharge conduit may connect a primer pump discharge outlet with a suction conduit positioned upstream of the pump inlet of the liquid fire retardant pump to fill the suction conduit with liquid fire retardant from the water tank before the first electric motor is commanded to rotate. A primer pump inlet conduit may be connected to a sump area of the water tank.

The boom may include a carbon fiber composite impregnated with copper mesh. The boom may include an outboard boom portion, an inboard boom portion, a coupler portion, wherein the coupler portion joins the inboard boom portion to the outboard boom portion. The coupler portion may include an outer collar, a spring, and a receiver. The outer collar may engage with an annular groove of the receiver, and the spring may be in compression when the coupler portion is connected to the inboard boom portion and to the outboard boom portion.

The fire suppression apparatus may include one or more electronic controllers in operative communication with the first electric motor and the air induction valve, where the one or more electronic controllers may be configured to automatically open the air induction valve upon activation of the liquid fire retardant pump. The fire suppression apparatus may include a foam pump configured to pump foam from the foam tank to the water tank, wherein the tank assembly housing may encase the foam pump. Each of the foam tank and the water tank may have an interior volume for holding fluid and the interior volume of the foam tank is five to ten percent of the interior volume of the water tank.

The inverter may provide electrical current to the first electric motor linearly from zero amps to approximately 65 amps over a period of 2 to 3 seconds.

In another embodiment, a fire suppression apparatus for fighting fires from a helicopter is disclosed including a powerpack configured for attachment to a fuselage of the helicopter via a vertical mount plate. The vertical mount plate is directly attachable to a pair of upper structural hardpoints of the helicopter fuselage and attachable to a pair of lower structural hardpoints of the helicopter fuselage via a pair of adjustable length connecting members that extend from the vertical mount plate to the lower structural hardpoints. The powerpack includes a liquid fire retardant pump configured to pump the liquid fire retardant comprising the foam and water. The liquid fire retardant pump is driven by a first electric motor. The liquid fire retardant pump includes a pump inlet and an air induction valve positioned at the pump inlet. The air induction valve includes an electrically variable valve opening where air and the liquid fire retardant are drawn together into the pump inlet and pressurized by the liquid fire retardant pump to form a pressurized water/foam/air fire retardant solution. The powerpack includes a liquid primer pump driven by a second electric motor. The liquid primer pump is configured to prime the pump inlet with the liquid fire retardant from the water tank. The powerpack also includes an inverter connected to the first electric motor. The inverter is configured to provide electrical current to the first electric motor to start the first electric motor over a period of 2 to 3 seconds to minimize startup current draw by the first electric motor In another embodiment, a fire suppression apparatus for fighting fires from a helicopter is disclosed including a cannon assembly configured for attachment to a fuselage of the helicopter via a vertical mount plate. The vertical mount plate is directly attachable to a pair of upper structural hardpoints of the helicopter fuselage and attachable to a pair of lower structural hardpoints of the helicopter fuselage via a pair of adjustable length connecting members that extend from the vertical mount plate to the lower structural hardpoints. The cannon assembly includes an aimable boom connected to a liquid fire retardant pump by a conduit, the boom including a nozzle on a distal end of the boom from which a pressurized fire retardant comprising water, foam, and air discharged by the liquid fire retardant is dispensed toward a target. The aimable boom includes (a) a carbon fiber composite impregnated with copper mesh for transmitting electrical energy from a lightning strike to the fuselage of the helicopter, and (b) an outboard boom portion, an inboard boom portion, and a coupler portion, where (i) the coupler portion joins the inboard boom portion to the outboard boom portion, (ii) the coupler portion includes an outer collar, a spring, and a receiver, (iii) the outer collar engages with an annular groove of the receiver, and (iv) the spring is in compression when the coupler portion is connected to the inboard boom portion and to the outboard boom portion.

DETAILED DESCRIPTION

Figure 1:
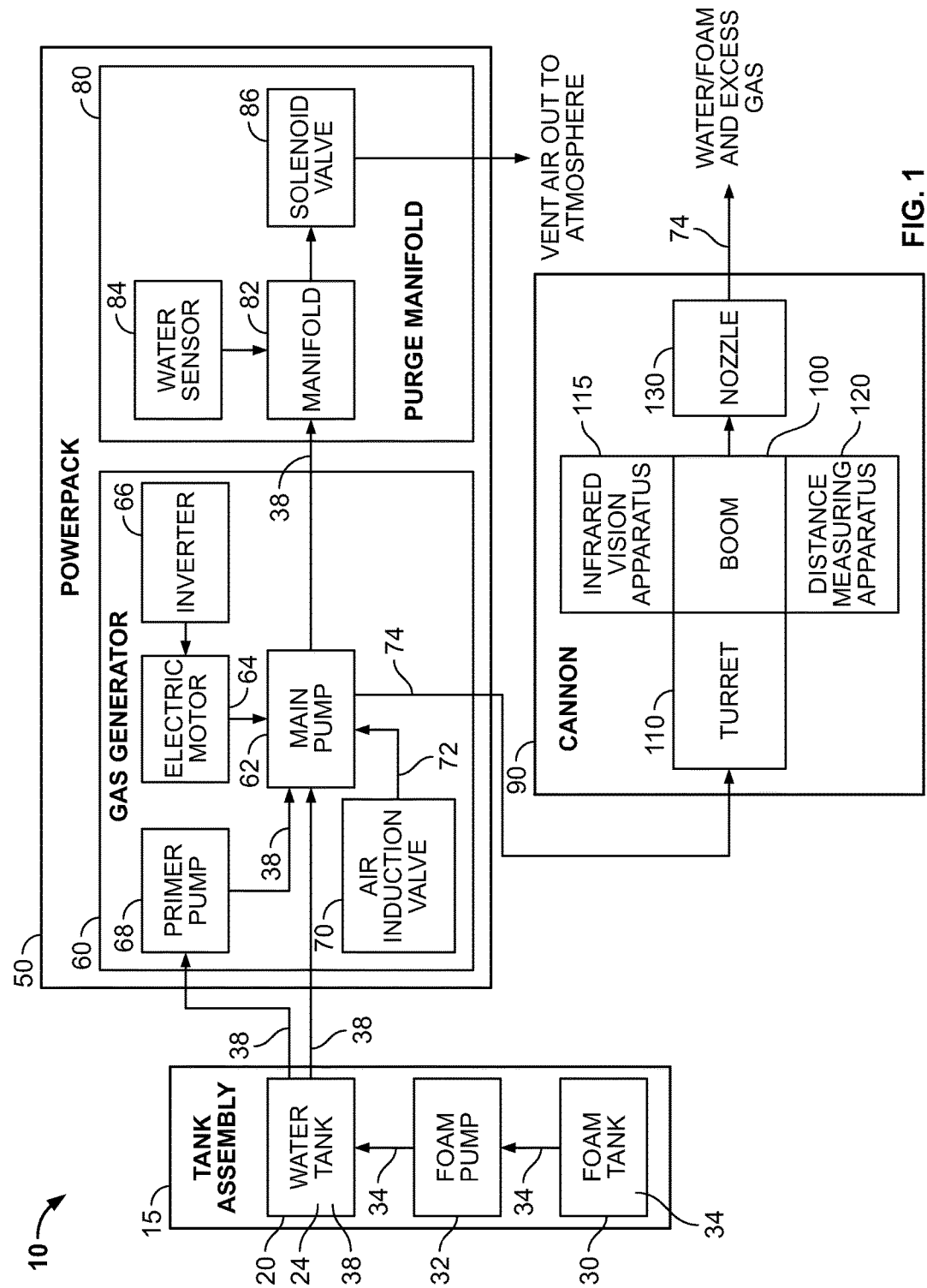
FIG. 1 is a schematic illustrating one embodiment of an aerial fire suppression system.
Figure 2A:
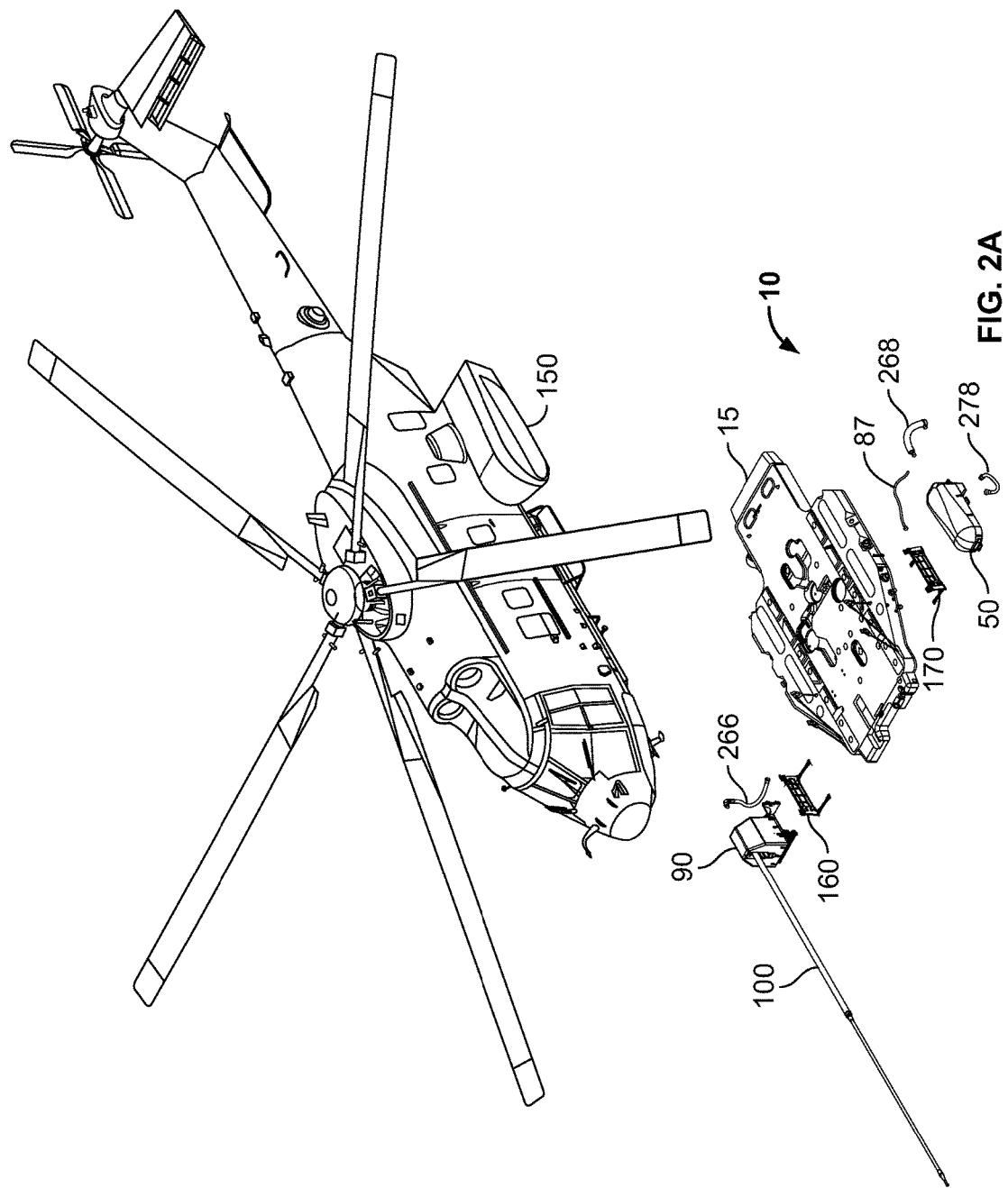
FIGS. 2A and 2B illustrate exploded perspective views of one embodiment of an aerial fire suppression system of the instant disclosure.
Figure 2B:
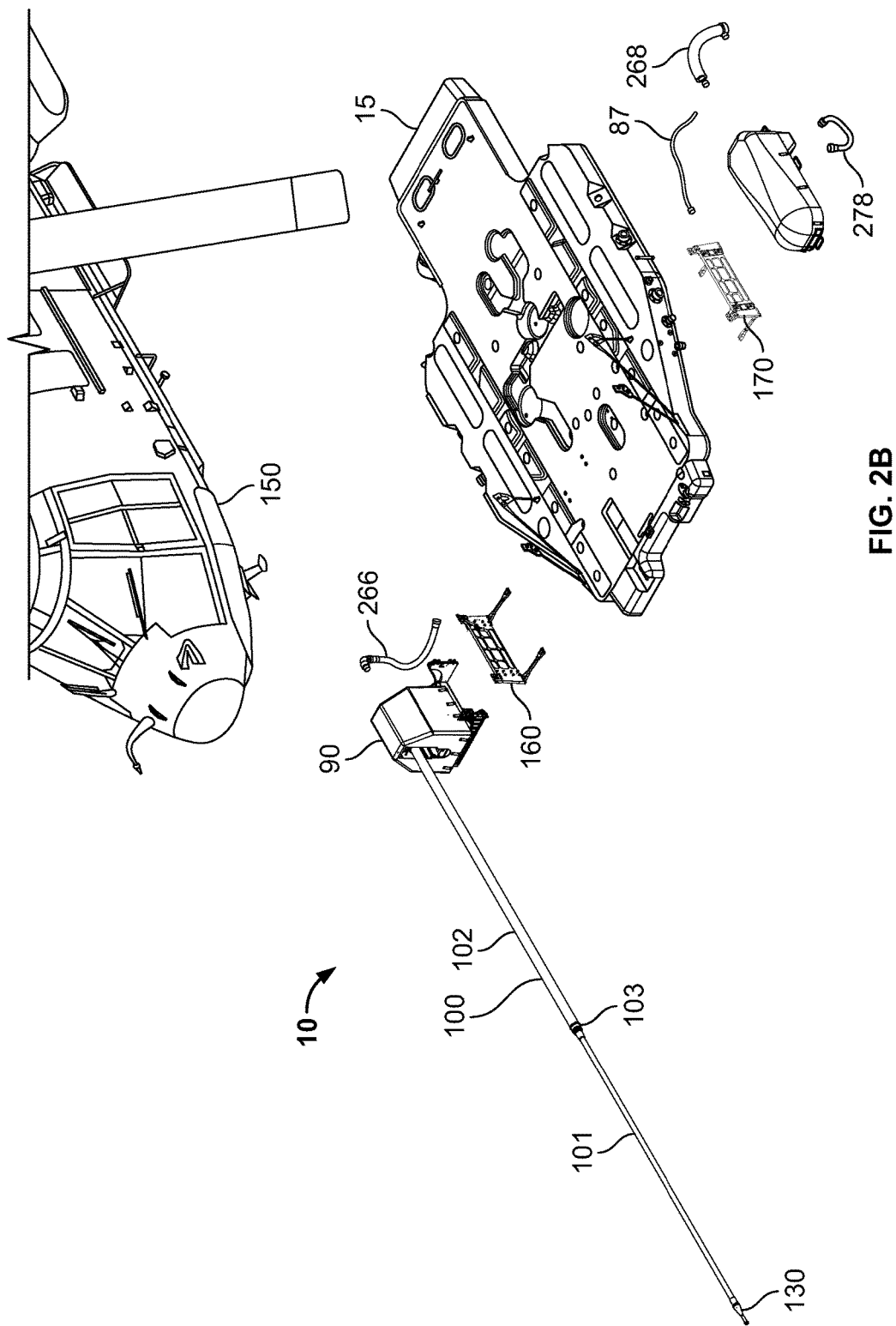
Figure 3:
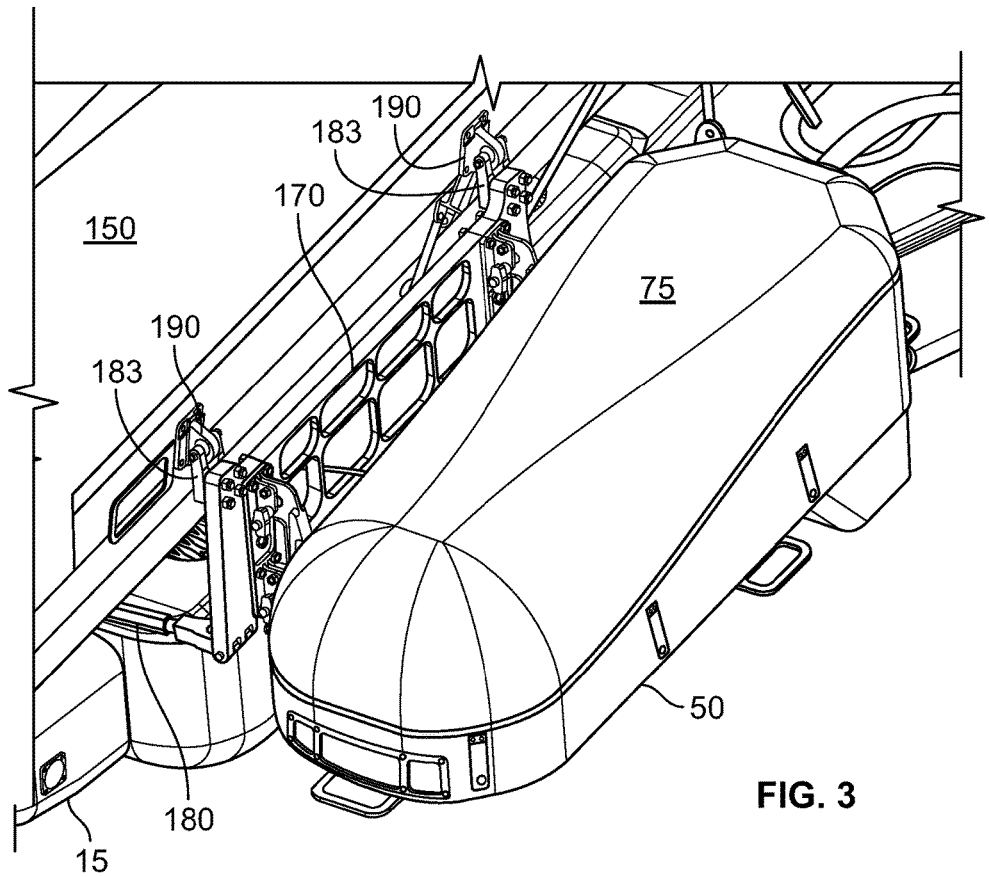
FIG. 3 is a front perspective view of an exemplary powerpack of the aerial fire suppression system shown in FIGS. 2A and 2B.
Figure 4:
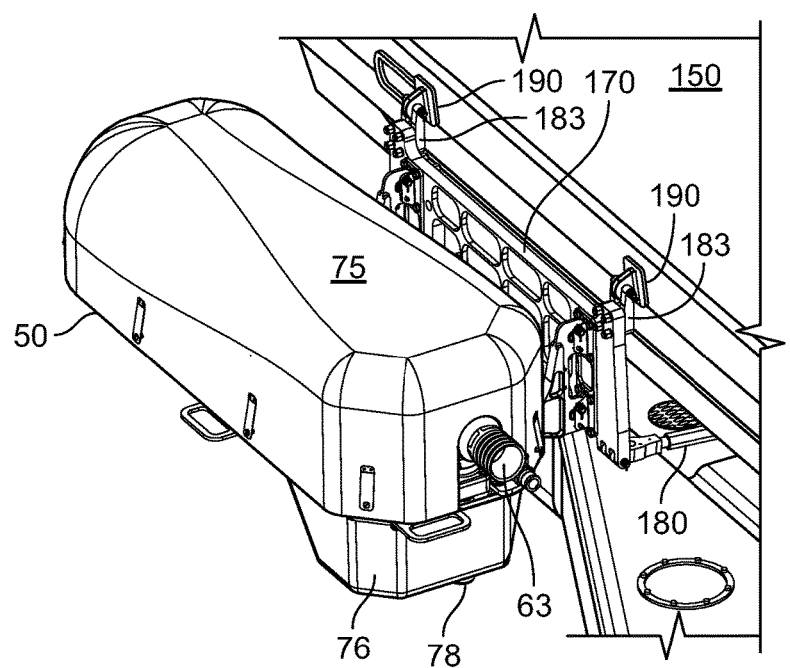
FIG. 4 is a rear perspective view of an exemplary powerpack of the aerial fire suppression system shown in FIGS. 2A and 2B.
Figure 5:
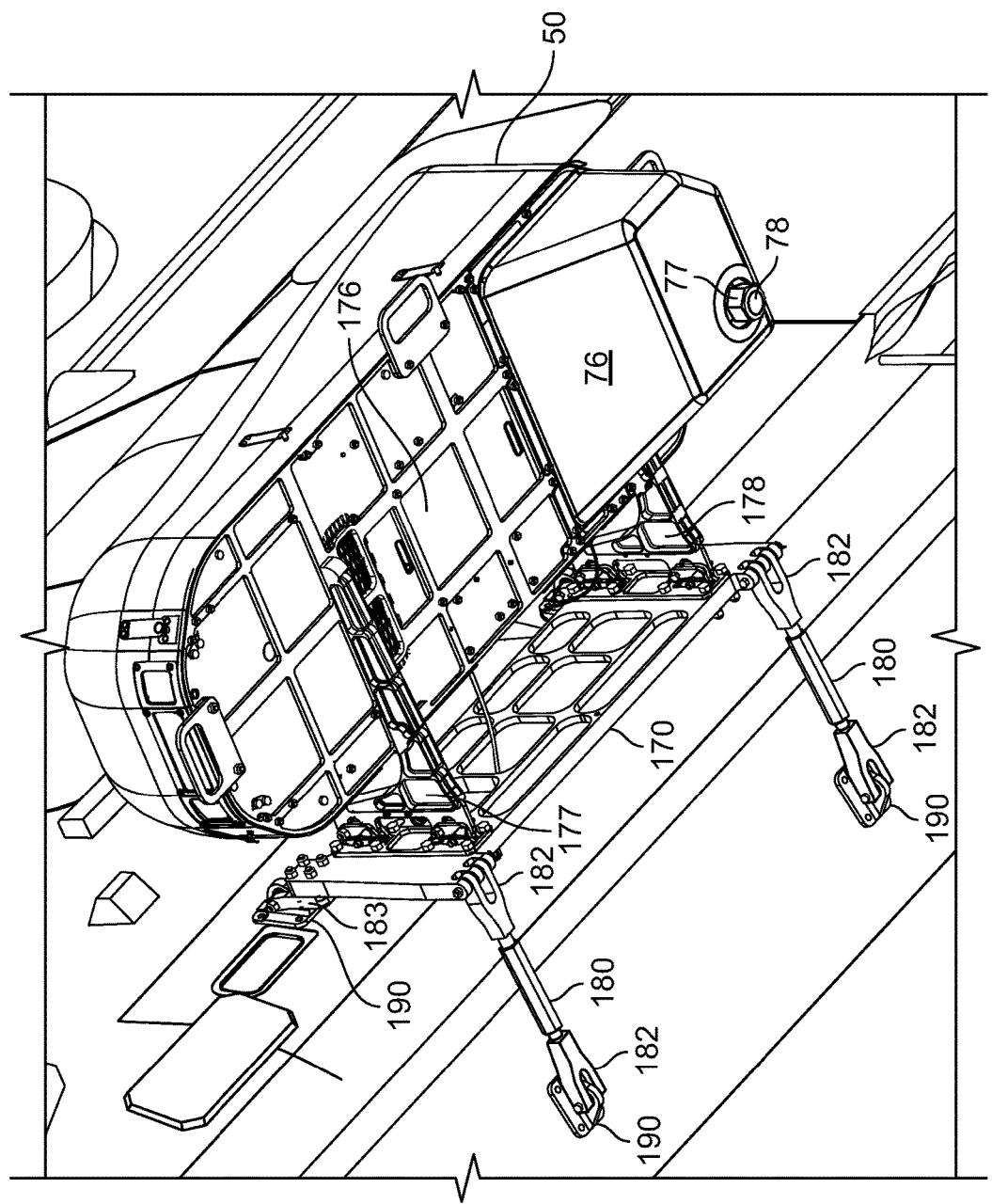
FIG. 5 is a bottom perspective view of an exemplary powerpack of the aerial fire suppression system shown in FIGS. 2A and 2B.
Figure 6:
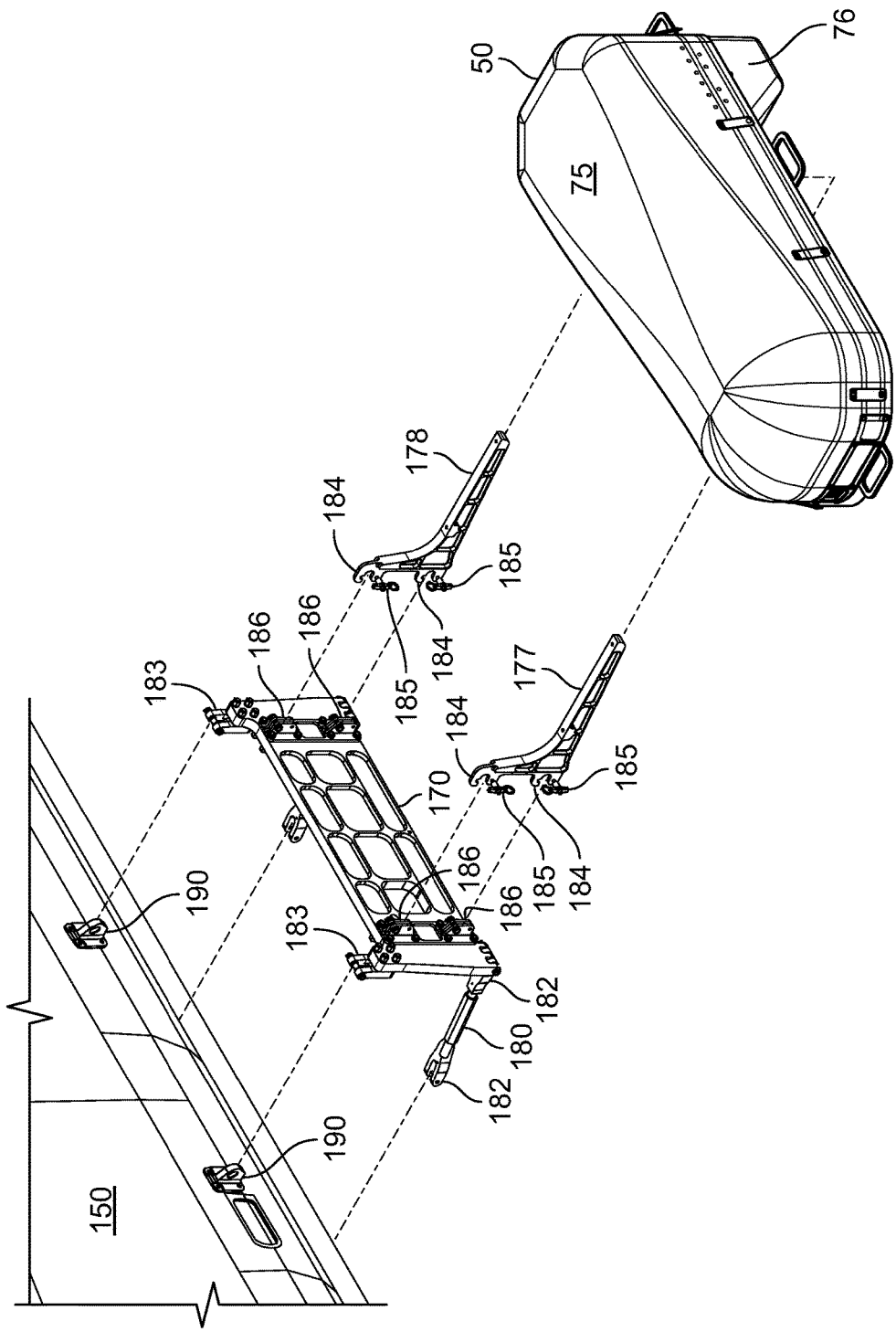
FIG. 6 is an exploded front perspective view of an exemplary powerpack of the aerial fire suppression system shown in FIGS. 2A and 2B.
Figure 7:
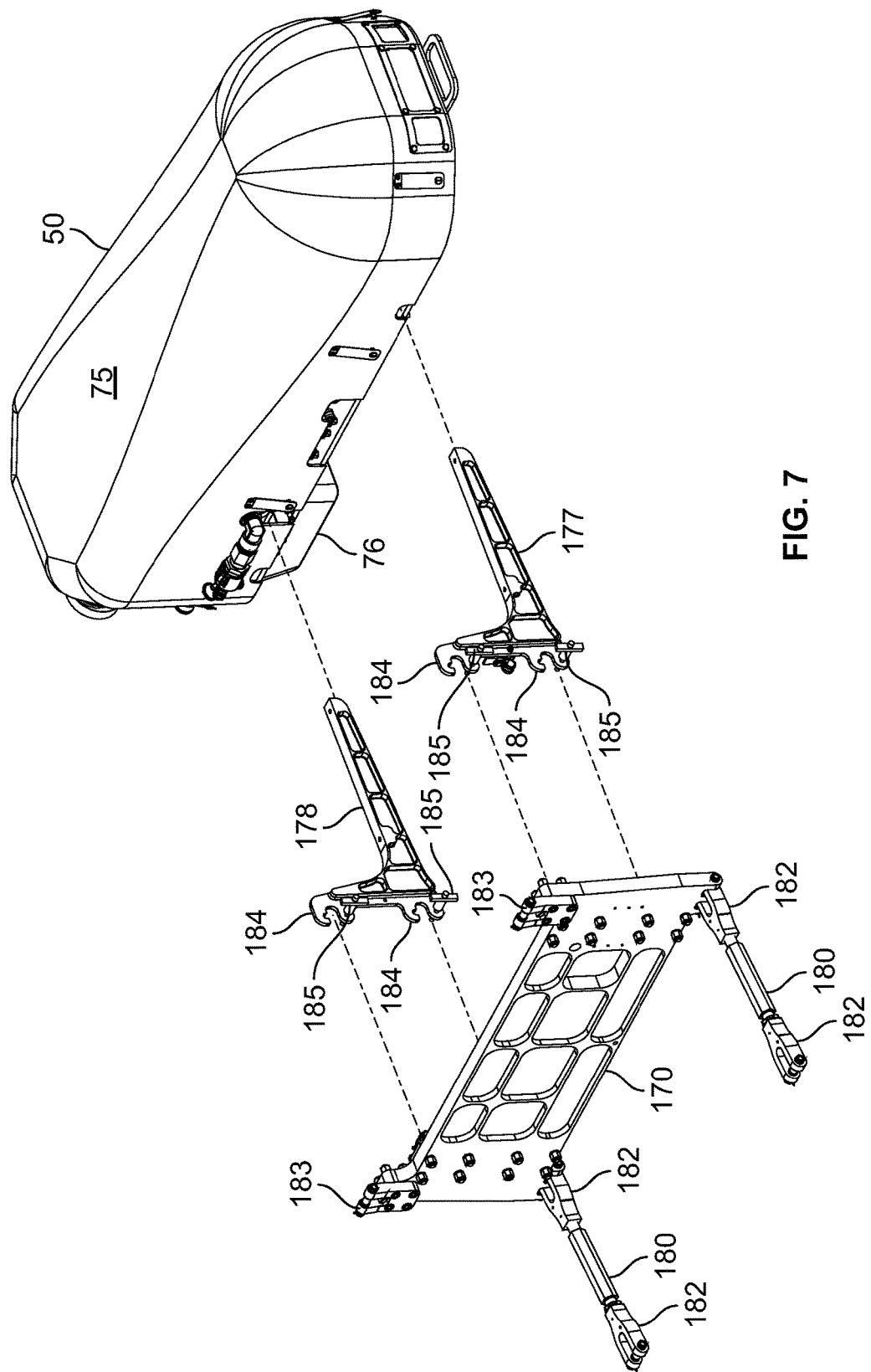
FIG. 7 is another exploded front perspective view of an exemplary powerpack of the aerial fire suppression system shown in FIGS. 2A and 2B.
Figure 8:
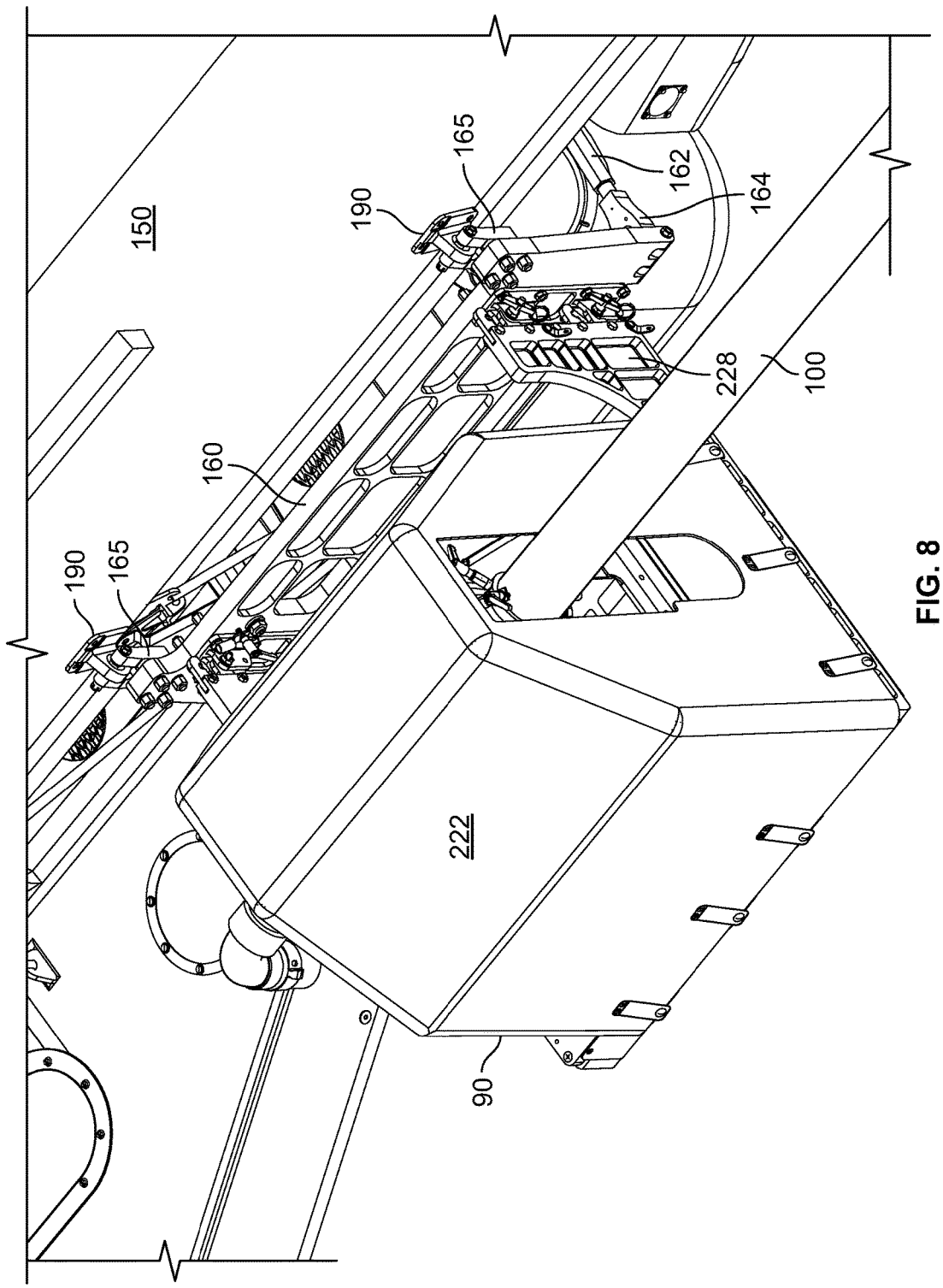
FIG. 8 is a front perspective view of an exemplary cannon assembly of the aerial fire suppression system shown in FIGS. 2A and 2B.
Figure 9:
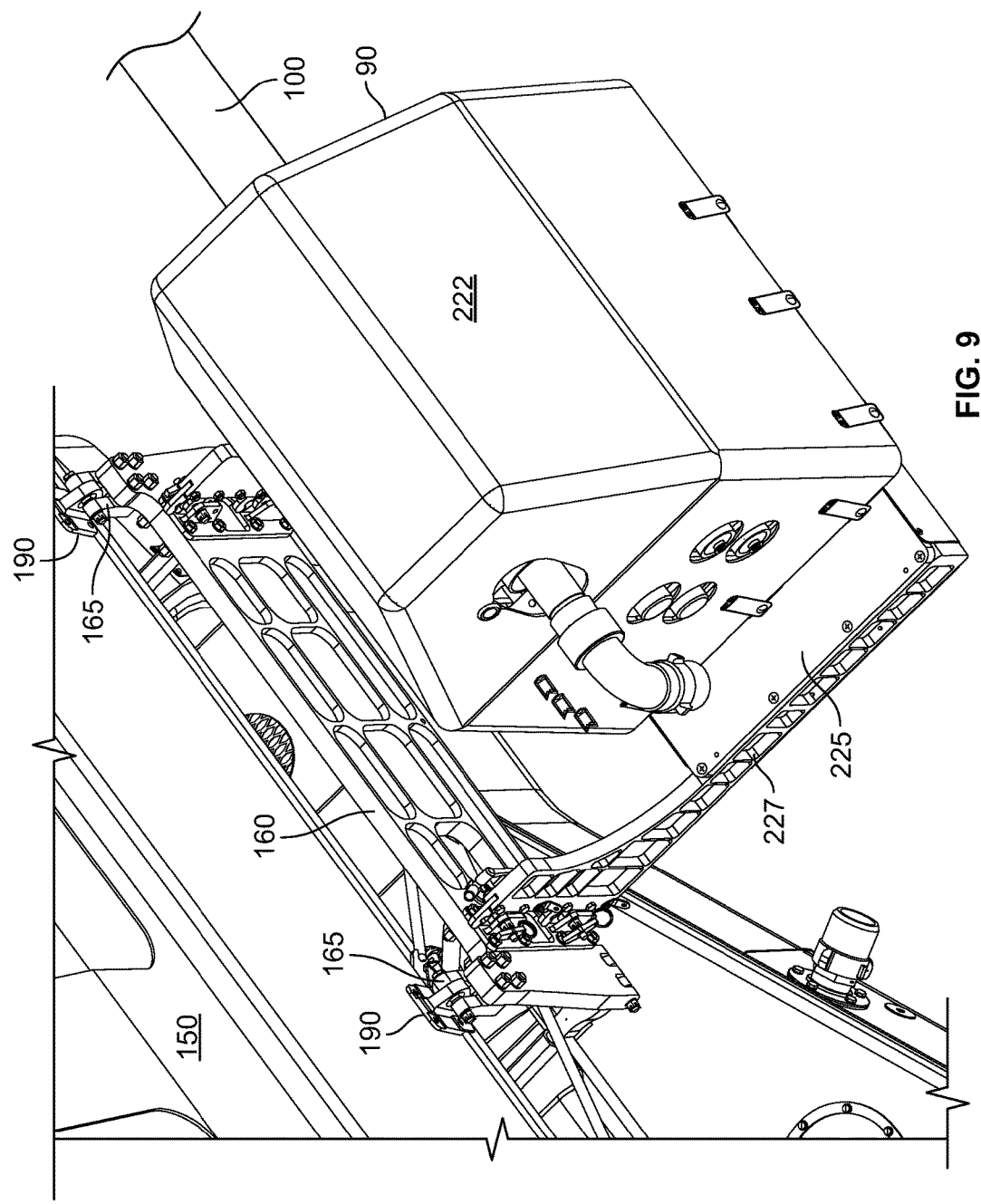
FIG. 9 is a rear perspective view of an exemplary cannon assembly of the aerial fire suppression system shown in FIGS. 2A and 2B.
Figure 10:
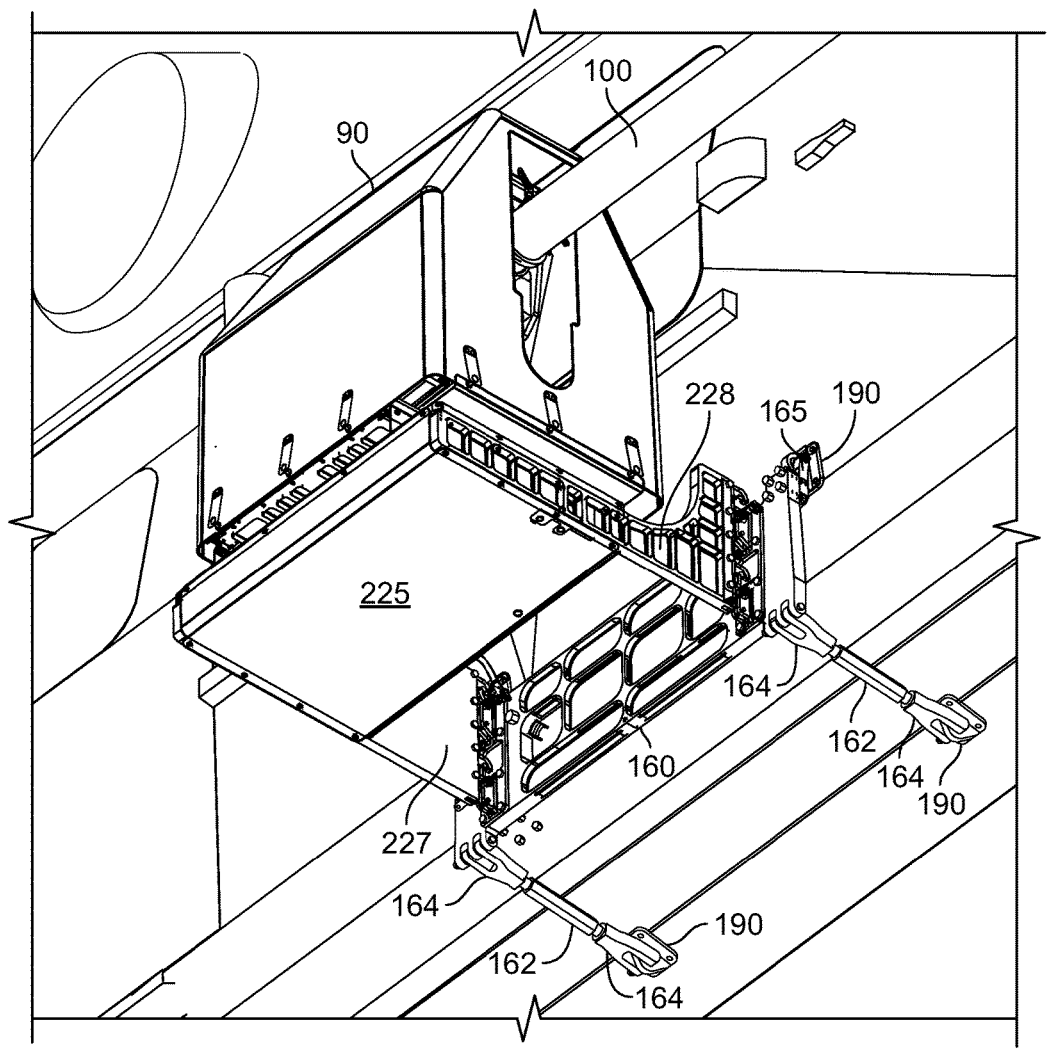
FIG. 10 is a bottom perspective view of an exemplary cannon assembly of the aerial fire suppression system shown in FIGS. 2A and 2B.
Figure 11:
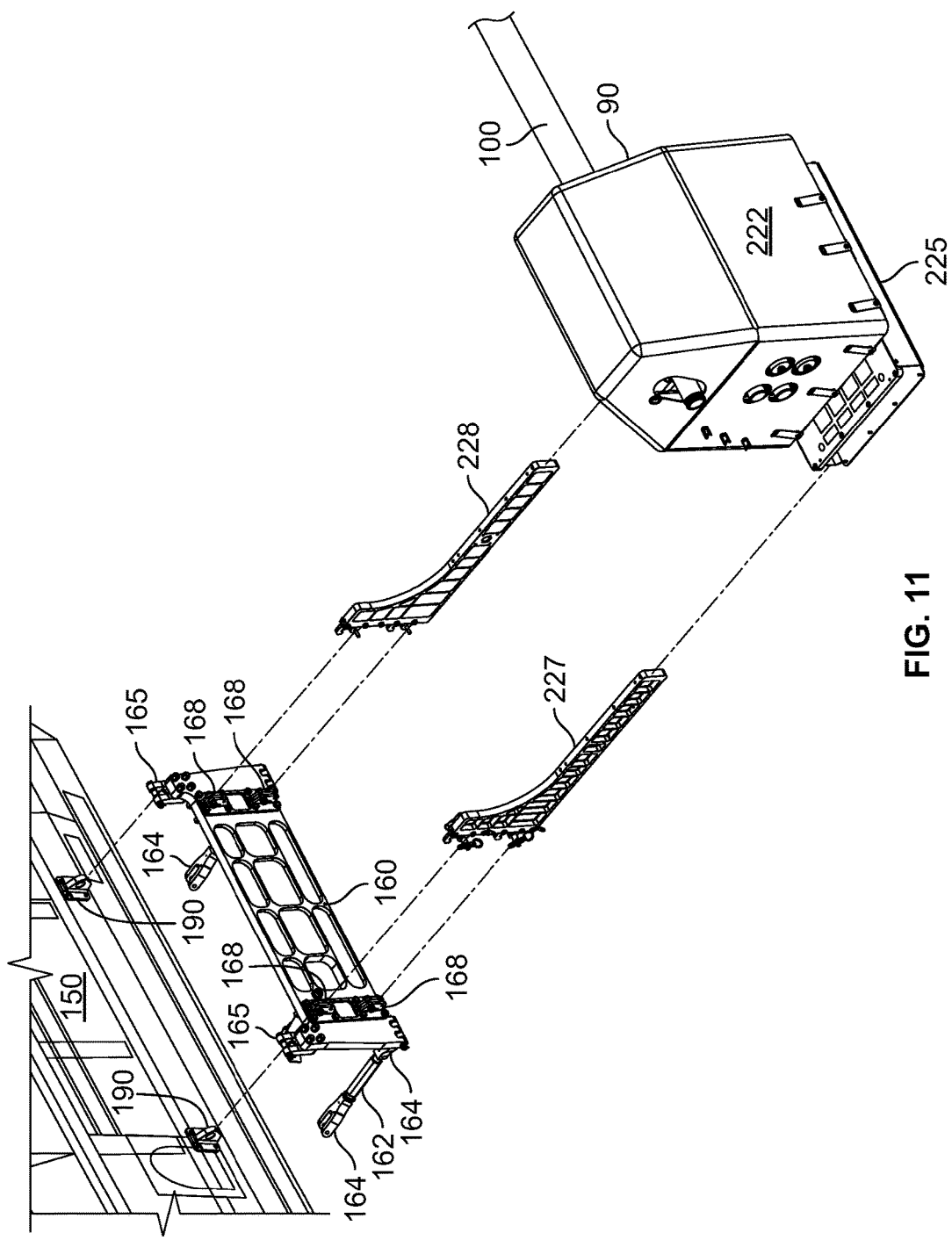
FIG. 11 is an exploded front perspective view of an exemplary cannon assembly of the aerial fire suppression system shown in FIGS. 2A and 2B.
Figure 12:
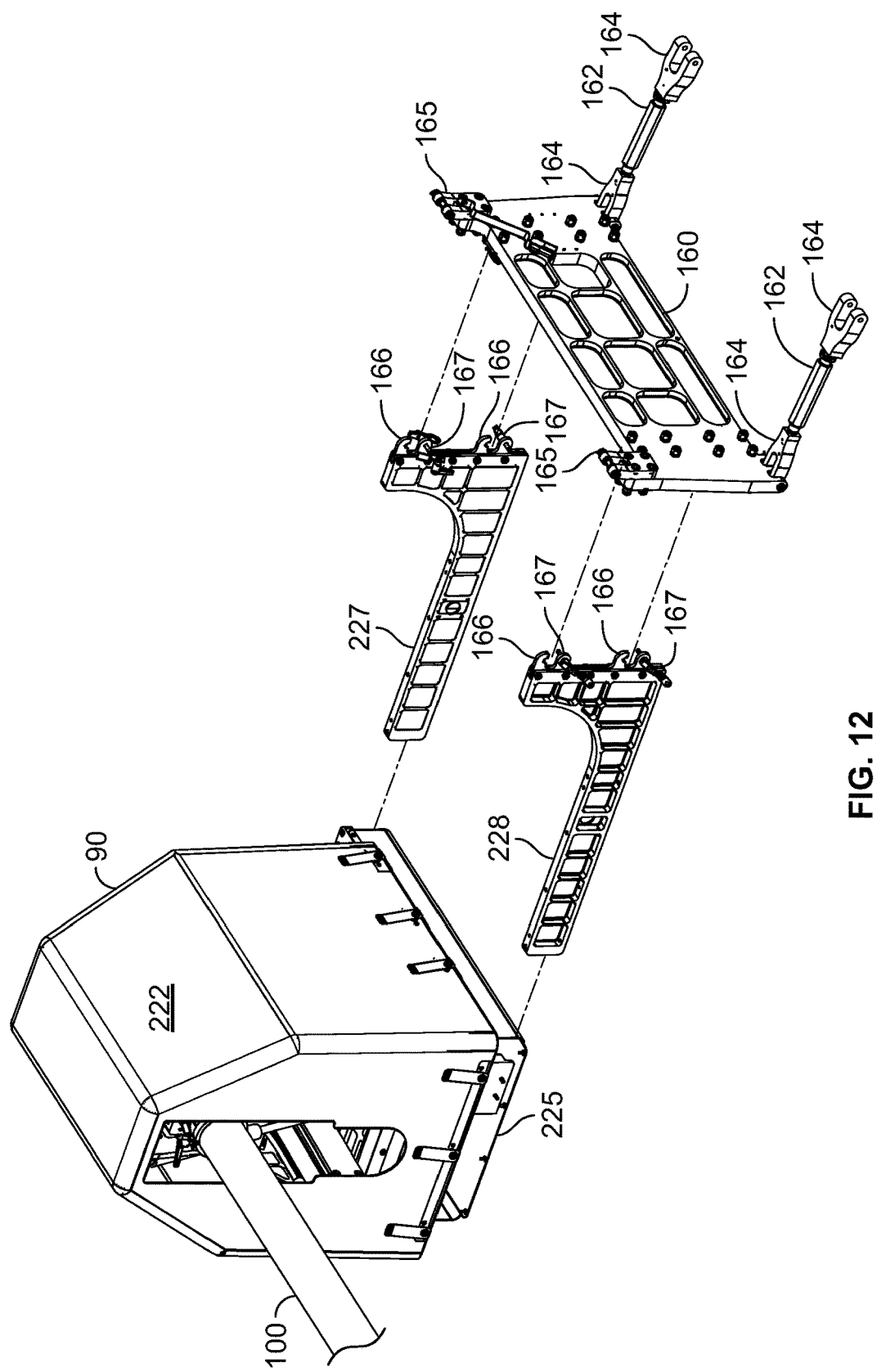
FIG. 12 is another exploded front perspective view of an exemplary cannon assembly of the aerial fire suppression system shown in FIGS. 2A and 2B.

Although the figures and the instant disclosure describe one or more embodiments of a fire suppression system for aerial vehicles, one of ordinary skill in the art would appreciate that the teachings of the instant disclosure would not be limited to such systems, and instead would also have utility on ground-based platforms and on airborne platforms for use in other industries, or wherever a volume of water, water mixture, or fluid of any kind is needed to be delivered to a target at a distance from the initiating platform. In one embodiment, a system of the instant disclosure may be used to fight fires in buildings and structures of all shapes and sizes, including on high-rise buildings and oil rigs. In another embodiment, a system of the instant disclosure may be used to fight wildfires. In another embodiment, a system of the instant disclosure may be used to clean buildings of all shapes and sizes, including mosques, water towers, and high-rise buildings. In another embodiment, a system of the instant disclosure may be used to clean high tension wire insulators on electrical towers and on windmills. In another embodiment, a system of the instant disclosure can be used to clean or deice structures, such as aircraft, windmills, power lines, and the like. In another embodiment, a system of the instant disclosure can be used to decontaminate an area, provide crowd control, or provide oil spill remediation.

Turning now to the figures, wherein like reference numerals refer to like elements, FIGS. 1-19 show an exemplary aerial fire suppression system 10 configured for use on an aerial vehicle, such as an aircraft or a helicopter, for use in suppressing wildfires or high-rise fires, among others.

In one embodiment, system 10 includes (a) a tank assembly for housing water, a water/foam solution, or any other fire retardant, (b) a powerpack for extracting the water, water/foam solution, or other fire retardant from the tank assembly and for pressurizing the water, water/foam solution, or other fire retardant, (c) a cannon assembly for delivering the pressurized water, water/foam solution, or other fire retardant toward a target downstream of the cannon assembly, and (d) an operator station for controlling the operation of system 10, including the operation of the powerpack and the aimpoint of the cannon assembly. System 10 may also include various plumbing, wiring, fittings, and structural supports to connect the foregoing to one another and/or to the aerial vehicle.

In one embodiment, as shown schematically for example in FIG. 1, system 10 includes tank assembly 15, which includes water tank 20 for storing water 24, one or more foam tanks 30 for storing foam (or foam concentrate) 34, and one or more foam pumps 32 for pumping foam (or foam concentrate) 34 from the one or more foam tanks 30 to water tank 20 to create a water/foam solution 38 in water tank 20 for use in fighting fires. Water tank 20 or the one or more foam tanks 30 or both may comprise one or more bladders positioned inside tank assembly 15 for holding water, a foam, and/or a water/foam solution. In the embodiment shown in the figures, two foam tanks 30 are positioned inside tank assembly 15, with one positioned on the port side and one on the opposite, starboard side of tank assembly 15 for maintaining center of gravity along the longitudinal centerline of tank assembly 15. Water 24 of water tank 20 may lie in the space inside tank assembly 15 not occupied by the two foam tanks 30 or other plumbing, tank structure, and the like and therefore may at least partially lie in contact with and/or partially surround the one or more foam tanks 30. Foam (or foam concentrate) 34 may be pumped from the one or more foam tanks 30 by the one or more foam pumps 32 to water tank 20 to create a batch of a water/foam solution 38 to create a fire retardant in water tank 20. As described more fully below, after the fire retardant is dispensed from system 10 toward a target and while the aerial vehicle remains in its mission, water 24 may be replenished using, for example, a retractable or nonretractable pump system to pump water from an open water source into water tank 20, after which more foam (or foam concentrate) 34 may be pumped into water tank 20 to create another batch of the fire retardant for dispensing from system 10. This cycle may be repeated so long as consumables, such as aircraft fuel and foam (or foam concentrate) 34, remain on board the aerial vehicle. In one embodiment of system 10, the one or more foam tanks 30 comprise approximately 5% to approximately 10% by volume of the amount of water carried in water tank 20. A suitable foam is Phos-Chek® WD881 Class A Foam, which is available from ICL Performance Products LP of St. Louis, Mo.

In addition to housing or supporting water tank 20, the one or more foam tanks 30 and the one or more foam pumps 32, tank assembly 15 may be configured to house or support system plumbing and conduit, baffles, sensors, interfaces, interconnects, and the like. For example, tank assembly 15 may include interface 262 and associated plumbing connected thereto, including conduits 268 and 270 for communicating water/foam solution 38 from water tank 20 to main water/foam pump 62 of powerpack 50, and interface 264 and associated plumbing connected thereto for receiving water/foam solution 38 discharged from main water/foam pump 62 and communicating water/foam solution 38 to conduit 266 and ultimately to boom 100 for discharge toward a target. One or more of conduits 266,268,270,278,280 may be configured as flexible conduits or inflexible conduits. Tank assembly 15 may include check valve 272 positioned at a proximal, sump end of conduit 270 to prevent backflow into water tank 20.

Tank assembly 15 may also include an anti-cavitation device mounted inside water tank 20 at the lowest point of water tank 20 to permit main water/foam pump 62 to withdraw water/foam solution 38 without cavitating main water/foam pump 62. In the case of a helicopter, the lowest point in water tank 20 may be in the aft portion of the tank when the helicopter is in hover mode.

As additionally shown schematically in FIG. 1, system 10 includes powerpack 50, which includes (a) gas generator 60 and (b) purge manifold 80. Gas generator 60 of powerpack 50 may be configured to introduce air into the water/foam solution 38 drawn from tank assembly 15 to aerate the water/foam solution 38 for optimum composition of the fire retardant, as described more fully below.

Gas generator 60 may include electric motor 64 powered by inverter 66 to slowly and controllably start and spin up electric motor 64 to minimize current draw and/or spikes in current draw, main water/foam pump 62 for pressurizing the water/foam solution 38, primer pump 68 for priming and/or filling the suction conduit with water/foam solution 38 from water/foam tank 20 before turning on electric motor 64, air induction valve 70 for introducing air in controlled amounts into the suction inlet of main water/foam pump 62, and enclosures 75,76 for protecting these components from damage. In one embodiment, inverter 66 is configured to cause the spin up of electric motor 64 to approximately 8000 RPM over the span of approximately 2 to 3 seconds by providing a linearly increasing amount of electrical current starting from zero amps to approximately 85 amps. In this embodiment, the current draw by electric motor 64 when operating at approximately 8000 RPM is approximately 85 amps. In some embodiments, the ramp up rate (i.e., slope) and the amount of electrical current delivered to the electric motor 64 are fully programmable. In some embodiments, the available electrical current from the aerial vehicle may be higher or lower than 85 amps. In these situations, the inverter 66 may be programmed to deliver the available current over a programmed period of time to cause electric motor 64 to reach a desired operating speed. In one embodiment, the available electrical current is 65 amps.

Powerpack 50 is configured to provide pressurized fire retardant comprising pressurized water/foam/air solution 74 to boom 100 at approximately 20 to approximately 150 gallons per minute (gpm). Enclosure 75 may be configured as a plurality of individually removable, lightweight yet sturdy panels or panel subassemblies to enclose or partially enclose powerpack 50. Enclosure 76 may be configured to house the ball valve underneath base 176.

Main water/foam pump 62 of gas generator 60 is configured to draw water/foam solution 38 from water tank 20 and pressurize it for discharge toward a target from boom 100. Main water/foam pump 62 is configured to draw in atmospheric air through air induction valve 70 and pressurize the air along with water/foam solution 38. More particularly, gas generator 60 of system 10 includes manually or automatically adjustable air induction valve 70 positioned at a suction inlet end of main water/foam pump 62, which is driven by electric motor 64. As directed by an operator using, for example, one of the controls discussed herein for operator station 240, main water/foam pump 62 is triggered "on" to draw water/foam solution 38 from water tank 20. At the same time, air induction valve 70 may be automatically or manually commanded to its "open" position, whereby atmospheric air 72 is drawn into a suction inlet end 63 of main water/foam pump 62 at the rate of approximately 30 CFM to approximately 50 CFM. In one embodiment, air induction valve 70 comprises an electrically variable valve opening, controllable by an operator or automatically according to a preprogrammed controller, to vary the amount of air introduced into the suction inlet end 63 of main water/foam pump 62 while main water/foam pump 62 is driven at a constant speed.

Main water/foam pump 62, which may include an axial inflow and radial outflow centrifugal impeller, then pressurizes and mixes air 72 along with water/foam solution 38 to approximately 125 psi and expels the pressurized fire retardant comprising pressurized water/foam/air solution 74 from pump discharge 79 through ball valve 77 having ball valve discharge 78 and through discharge conduit 278 at approximately 150 gpm. The discharged fire retardant is then conveyed to cannon assembly 90 via cross feed conduit 280 positioned in water tank 20 between interfaces 262 and 264 positioned on either side of tank assembly 15 and ultimately via conduit 266 leading from tank assembly 15 to cannon assembly 90 The introduction of air 72 by system 10 for mixing with and pressurization of water/foam solution 38 for delivery through conduit 266 to boom 100 aids in the creation of tightly-formed foam bubbles of an optimum size for the fire retardant before ejection of the fire retardant from nozzle 130 of boom 100 and to aid in achieving the greatest possible distance of the fire retardant downrange of nozzle 130. Because the centrifugal impeller of main water/foam pump 62 turns at a relatively high speed of approximately 8000 RPM, it does not appreciably lose suction when drawing in the approximately 30-50 CFM of air 72 along with water/foam solution 38. And because air 72 is a limitless resource when drawn from the atmosphere, time on-station over a target, such as a fire, would be limited to the amount of other consumables carried aboard the aerial vehicle, such as water, foam, or fuel. Consequently, system 10 including gas generator 60 provides a simplified, highly efficient means for providing compressed air foam aboard aerial vehicles for use in engaging a target.

In one embodiment of system 10 comprising gas generator 60, where water tank 20 is sized to hold approximately 800 gallons of water, the one or more foam tanks 30 are sized to hold approximately 80 gallons of foam or foam concentrate, the dry weight of system 10 is approximately 1015 lbs, and when fully loaded with consumables, such as water and foam, the weight of system 10 is approximately 7580 lbs. At an approximately 0.5% foam to water ratio, system 10 having this configuration is capable of 5 minutes of use on-station.

Figure 13A:
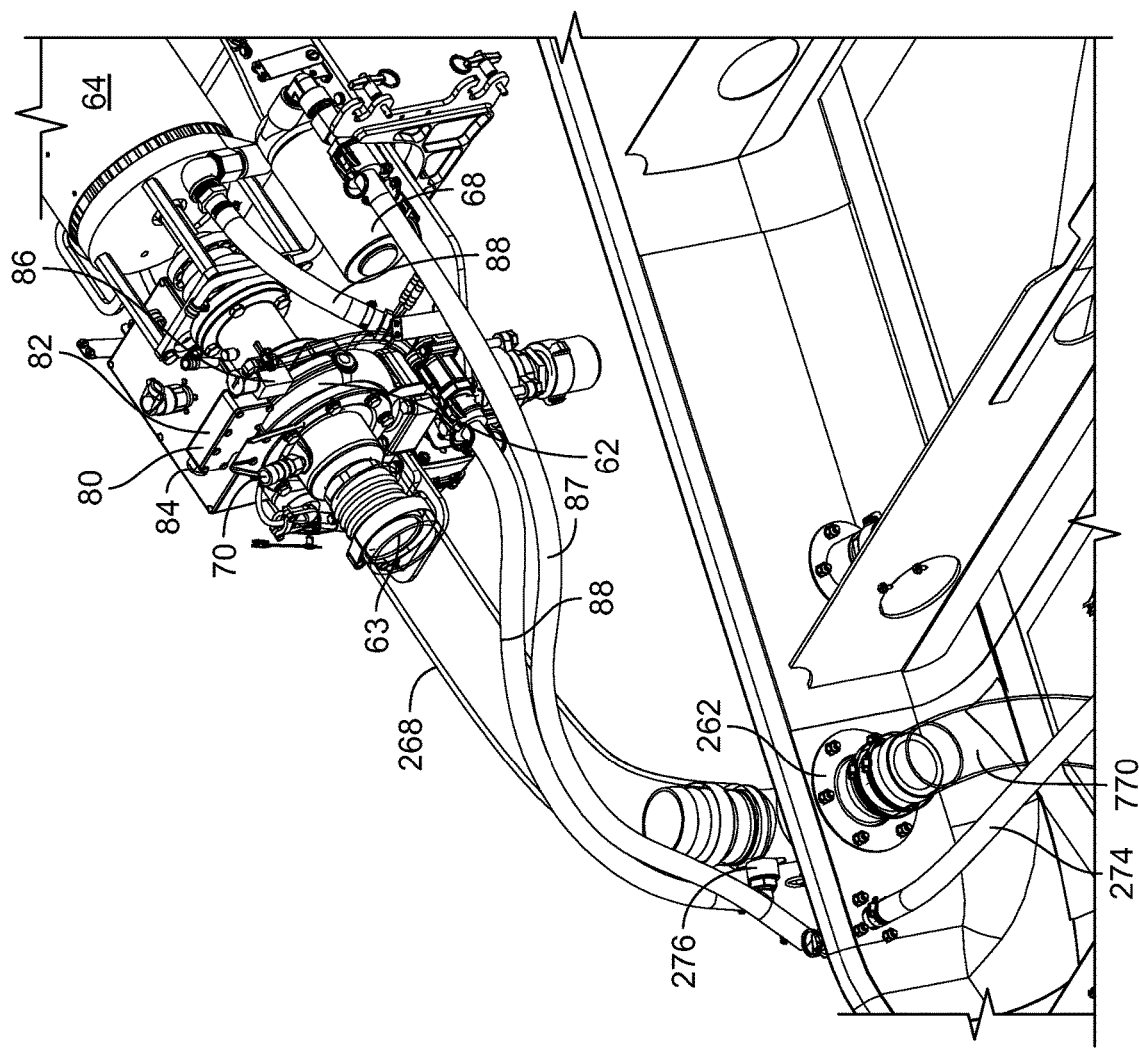
FIGS. 13A and 13B illustrate a partial front perspective view of the exemplary powerpack of the aerial fire suppression system shown in FIGS. 2A and 2B.
Figure 13B:
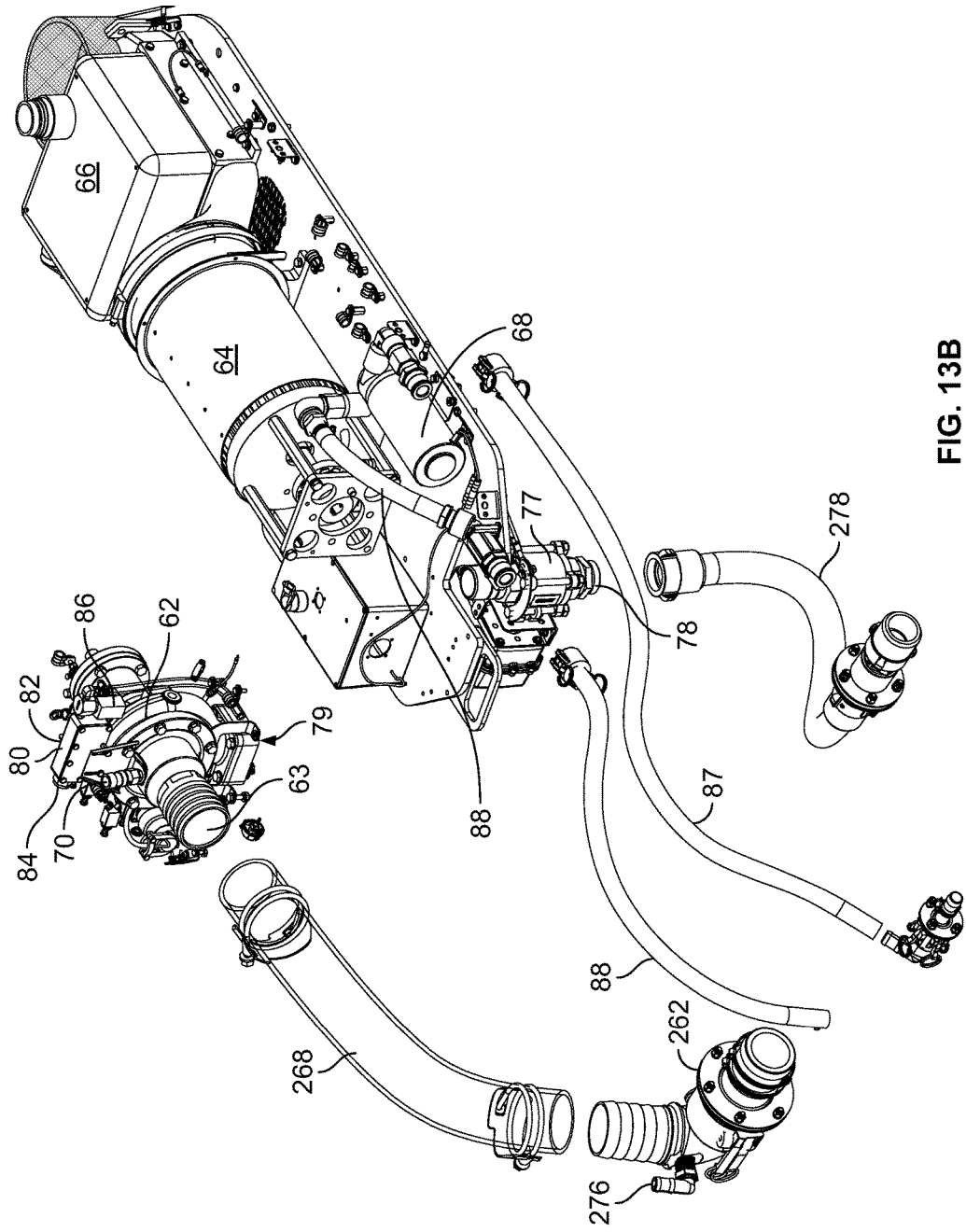

As best shown in FIGS. 13A-13B, primer pump 68 may be configured to work in combination with purge manifold 80 to fill the suction line with fire retardant comprising water/foam solution 38 from approximately the sump area of water tank 20 to the inlet 63 of main water/foam pump 62. In one embodiment, primer pump 68 is configured to fill the suction line in approximately 15 seconds. When ball valve 77 is closed, air displaced from the suction line during the process of filling the suction line, such as conduit 268, with the fire retardant may be vented from the system before engaging electric motor 64 to drive the main water/foam pump 62. With the suction line filled or nearly filled with liquid fire retardant, smooth and efficient startup of the main water/foam pump 62 may be achieved, particularly when the impeller of the main water/foam pump 62 has limited suction performance. For example, purge manifold 80 may include manifold 82 positioned on the top of main water/foam pump 62, with water sensor 84 positioned on the manifold 82 for confirming the presence of liquid fire retardant at the manifold after the suction line and main water/foam pump 62 have substantially filled with fire retardant, and solenoid valve 86 positioned on the manifold and configured to be commanded in the open position to allow air from the suction line to vent to the atmosphere when the fire retardant fills the suction line. Primer pump 68 may be commanded to operate so long as water sensor 84 does not register a liquid at the sensor. As shown in the figures, fire retardant is drawn up by primer pump 68 from a sump end of primer conduit 274 located in water tank 20 and conveyed to primer feed and discharge lines 87,88, respectfully, located externally from water tank 20 to a port 276 located at a base of conduit 268 near interface 262.

As additionally shown schematically in FIG. 1, system 10 may include cannon assembly 90. Cannon assembly 90 of system 10 includes turret 110, boom 100 having nozzle 130 at a distal end, and optionally, infrared vision apparatus 115 and distance measuring apparatus 120. As shown in FIG. 15, turret 110 of system 10 includes linear actuator 212 and rotary actuator 214 that may be programmed to control the direction and speed of movement of boom 100 and turret 110, respectively, via joystick 250 (see, e.g., FIG. 14). Turret 110 includes base 225, which in turn, is supported by supports 227 and 228 (see, e.g., FIGS. 8-12) for supporting and mounting cannon assembly 90 to the airframe of helicopter 150.

Turret 110 includes rotary drive system 230 which is connected to rotary actuator 214 for rotating turret 110 along a generally vertical axis to cause boom to move horizontally. Turret 110 includes a bearing upon which housing 222 and the remainder of turret 110 is supported. Consequently, when rotary actuator 214 engages rotary drive system 230, housing 222 and the remainder of turret 110 rotates in the direction of travel of rotary actuator 214 relative to base 225.

To move boom 100 vertically, linear actuator 212 is connected to a pivot arm, which in turn, is connected to boom 100. Compound (diagonal) movement of boom 100 may be achieved by engaging linear actuator 212 and rotary actuator 214 simultaneously, perhaps at different rates. Actuators 232 are connected to boom 100 to assist linear actuator 212 to return boom 100 to the horizontal position, such as in the event of a power failure. To automatically stow and return turret 110 and boom 100 to a safe, forward-projecting, and locked configuration for egress of the aerial vehicle in an emergency or in the event of failure or interruption of electrical power supply to system 10 or a mechanical or electrical failure of any component of system 10, such as actuator 212, turret 110 of system 10 may be configured with a mechanical turret return system. The mechanical turret return system may be configured to wind a roller chain on a plate located on the aft end of turret 110 to compress one or more gas struts positioned on the aft end of turret 110. If electrical power is cut off, for example, to cannon assembly 90, then the gas struts release the energy stored therein, which causes the plate to freewheel and unwind the roller chain. In this process, turret 110 is caused to rotate to its home position with the boom aimed in a forwardly projecting manner with the assistance of actuators 232.

As previously described, infrared vision apparatus 115 including infrared camera 117 may be mounted on turret 110 or elsewhere on cannon assembly 90. Likewise, distance measuring apparatus 120 comprising a laser for determining the distance between the aerial vehicle and any obstructions or buildings, is shown mounted on base 225, but could be mounted on any structure of system 10 or on the aerial vehicle itself.

As described above, upon exiting powerpack 50, the mixed and pressurized fire retardant comprising the pressurized water/foam/air solution 74 is delivered to boom 100 via conduits 278, 280 and 266 and dispensed from boom 100 via nozzle 130 toward the aim point of boom 100. Boom 100 may incorporate lightweight materials and geometry uniquely suited to permit a relatively lengthy boom 100 while providing a flow rate of fluids therefrom sufficient to suppress a fire located a substantial distance away from the vehicle. For example, boom 100 may be configured from one or more pieces and may be constructed of a composite material to provide sufficient rigidity to withstand excessive bending or deflection along its length, especially in the presence of, for example, rotor downwash when installed on a helicopter.

Boom 100 may also be configured to extend beyond the rotor tip diameter of a helicopter, for example, to avoid undesirable, pre-dispersion or atomization of the water/foam/air solution 74. In one embodiment, boom 100 is approximately 6.7 to 7.3 meters long and extends at least approximately 1 meter past the rotor tip. In some embodiments, at least the distal end of boom 100 may be constructed of one or more materials that provide electrical insulating properties to prevent the conduction and transmission of electricity should boom 100 be used in or near electrical power lines, for example, such as when fighting fires situated in close proximity to electrical power lines or when cleaning power line insulators on electrical power line towers. Besides composite materials, boom 100 may be constructed from other materials that provide the foregoing and other desirable properties and functionality, including wound carbon fiber and fiberglass, matt resin, and aluminum, among others. In view of its length beyond the rotor tip, boom 100 may be formed into a relatively light yet strong and deflection resistant structure to avoid excessive shifting of the center of gravity of the aerial vehicle and to avoid deflection of the distal tip of boom 100 into the path of the rotor blades.

Boom 100 may be constructed to permit its telescoping extension and retraction to, for example, provide compact stowage during ground operations and during flight while also providing the ability to position the distal end of nozzle 130 beyond the rotor tip while in use and on station at the location of a fire. Boom 100 may alternatively be constructed as a fixed length.

Boom 100 may be configured to operate in a "wet" configuration or in a "dry" configuration. For operation in a "wet" configuration, the working fluid, such as a water/foam solution, is communicated through boom 100 to nozzle 130 and "wets" the internal surfaces of boom 100. By contrast, boom 100 may be configured in a "dry" configuration in which an internal hose communicates the working fluid therein to nozzle 130. A "dry" configuration involving an internal hose may not easily allow boom 100 to also be of a telescoping configuration, whereas boom 100 having a "wet" configuration coupled with a telescoping configuration may lead to binding of or leakage through telescoping elements of boom 100.

Boom 100 may be aimed in any horizontal direction defined by the rotation of turret 110 via rotary drive system 230 and in any vertical direction defined by the movement of boom via linear actuator 212. Operation of boom 100 may reduce pilot workload if a dedicated operator of system 10 is located on the aerial vehicle or is remotely operating system 10 thereby allowing the pilot to fly the vehicle while also improving the firefighters' ability to target the fire independent of vehicle movement. Sideward deployment may help the pilot position and orient the vehicle to obtain optimum flight characteristics, and may facilitate use of emergency escape routes because the vehicle is pointing away from the fire, potentially in the direction of intended travel. By contrast, forward deployment of boom 100 in a rotorcraft can negatively impact rotorcraft stability because a tail wind may be created by the consumption of air by the fire.

Figure 18:
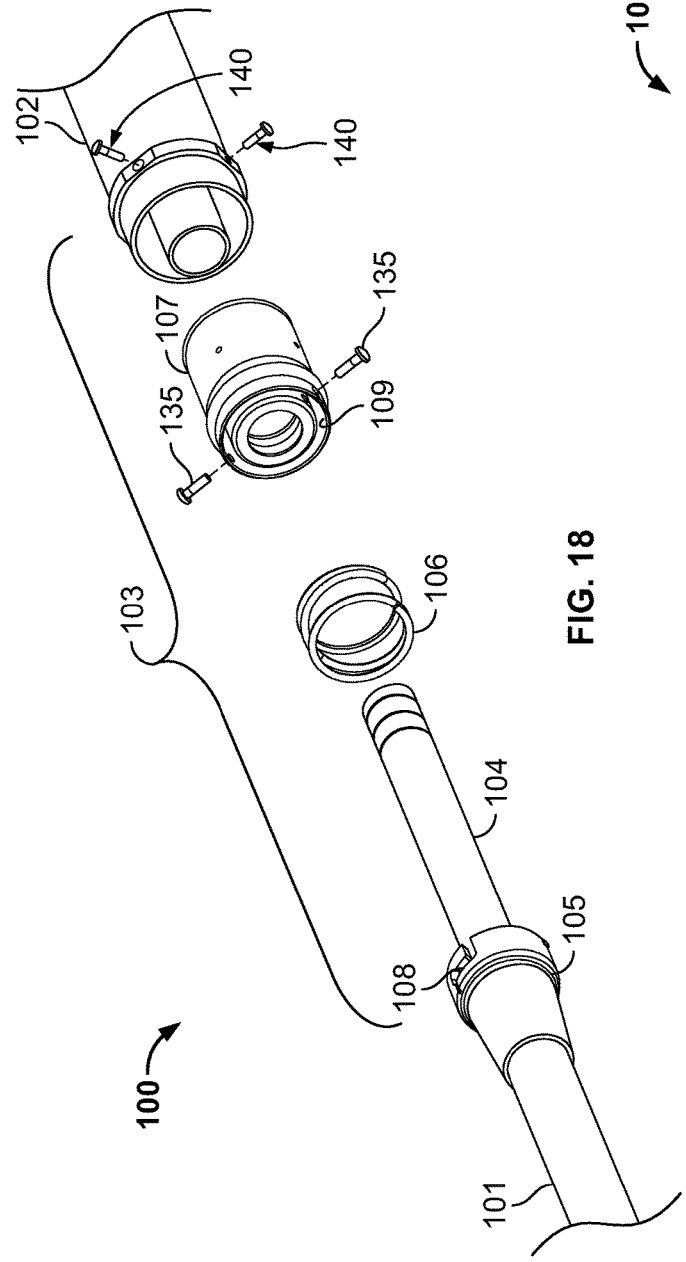
FIG. 18 illustrates a partial exploded perspective view of a boom of the aerial fire suppression system shown in FIGS. 2A and 2B.
Figure 19:
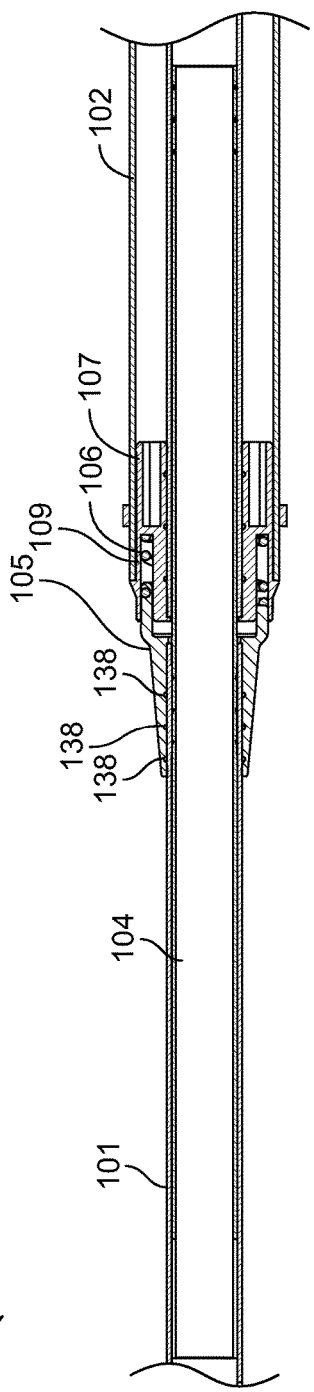
FIG. 19 illustrates a partial cross sectional view of the boom shown in FIG. 18.

In one embodiment, as shown in FIGS. 18 and 19, boom 100 may be a wet boom configured from a two-piece, carbon fiber composite impregnated with copper mesh that is capable of conveying electrical energy from a lightning strike from the distal end to the proximal end of the boom to dissipate the energy through the rotor. In this embodiment, boom 100 includes an outboard boom portion 101, an inboard boom portion 102, a coupler portion 103 configured to join the outboard boom portion 101 to the inboard boom portion 102, and a stiffener tube 104 positioned on an inner diameter to provide stiffness to the joined coupling. The coupler portion 103 includes outer collar 105, spring 106, and receiver 107. Outer collar 105 is configured with an engager 108 to engage with annular groove 109 and shear pins 135 of receiver 107 while being biased apart by spring 106. A plurality of o-rings 138 may be positioned in circumferential grooves on one or more internal components to ensure a water tight seal. Receiver 107 and bolts 140 may be configured from a metal so as to convey lightning-derived electrical energy from the copper mesh of the outboard boom portion 101 to the inboard boom portion 102 to the aircraft for dissipation.

Figure 14:
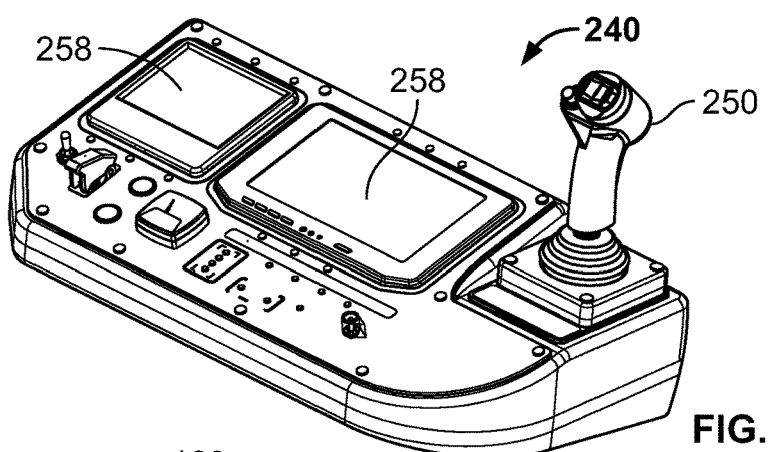
FIG. 14 illustrates an exemplary operator station for use in connection with the aerial fire suppression system shown in FIGS. 2A and 2B.
Figure 15:
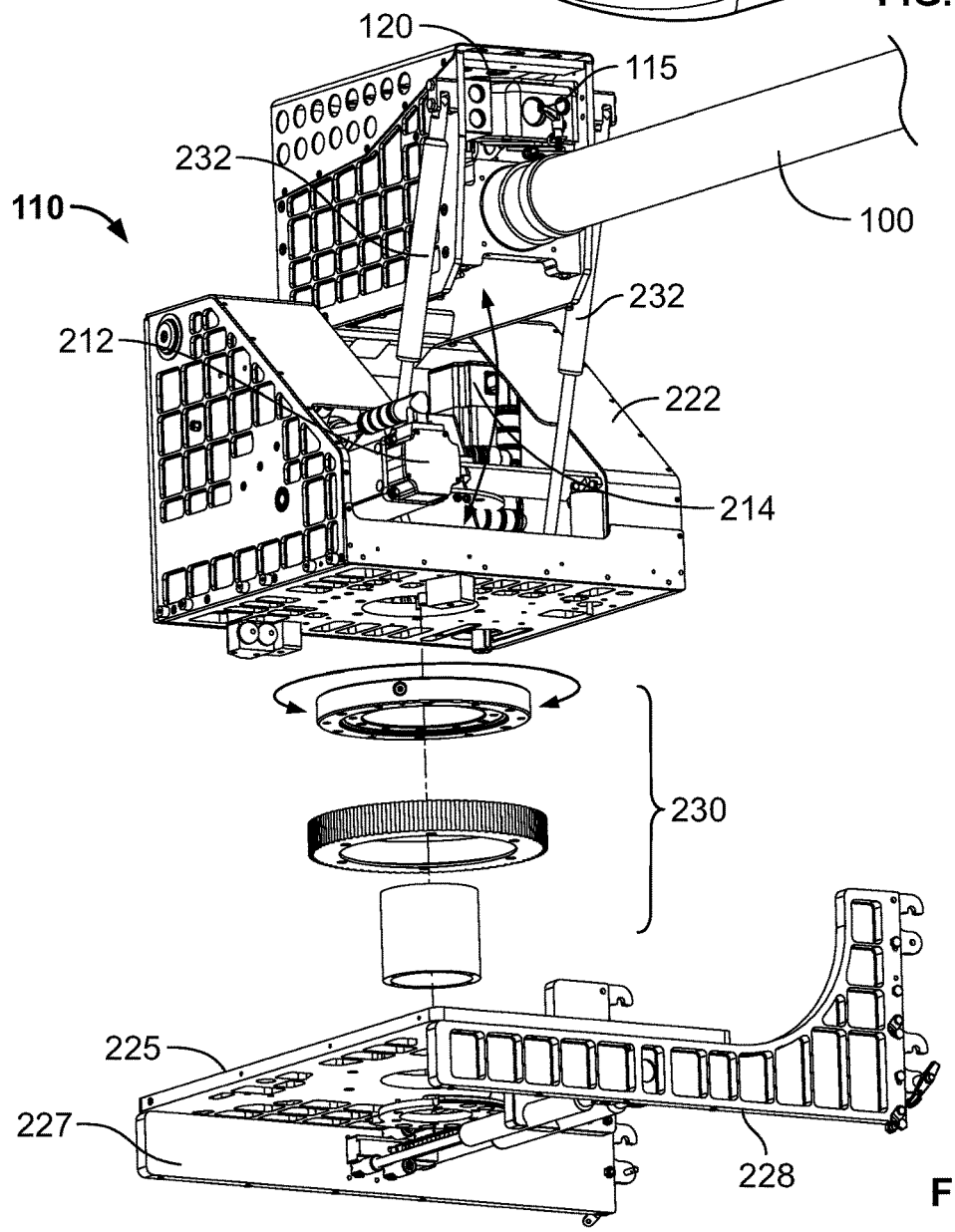
FIG. 15 illustrates an exploded front perspective view of an exemplary turret portion of a cannon assembly of the aerial fire suppression system shown in FIGS. 2A and 2B.
Figure 16:
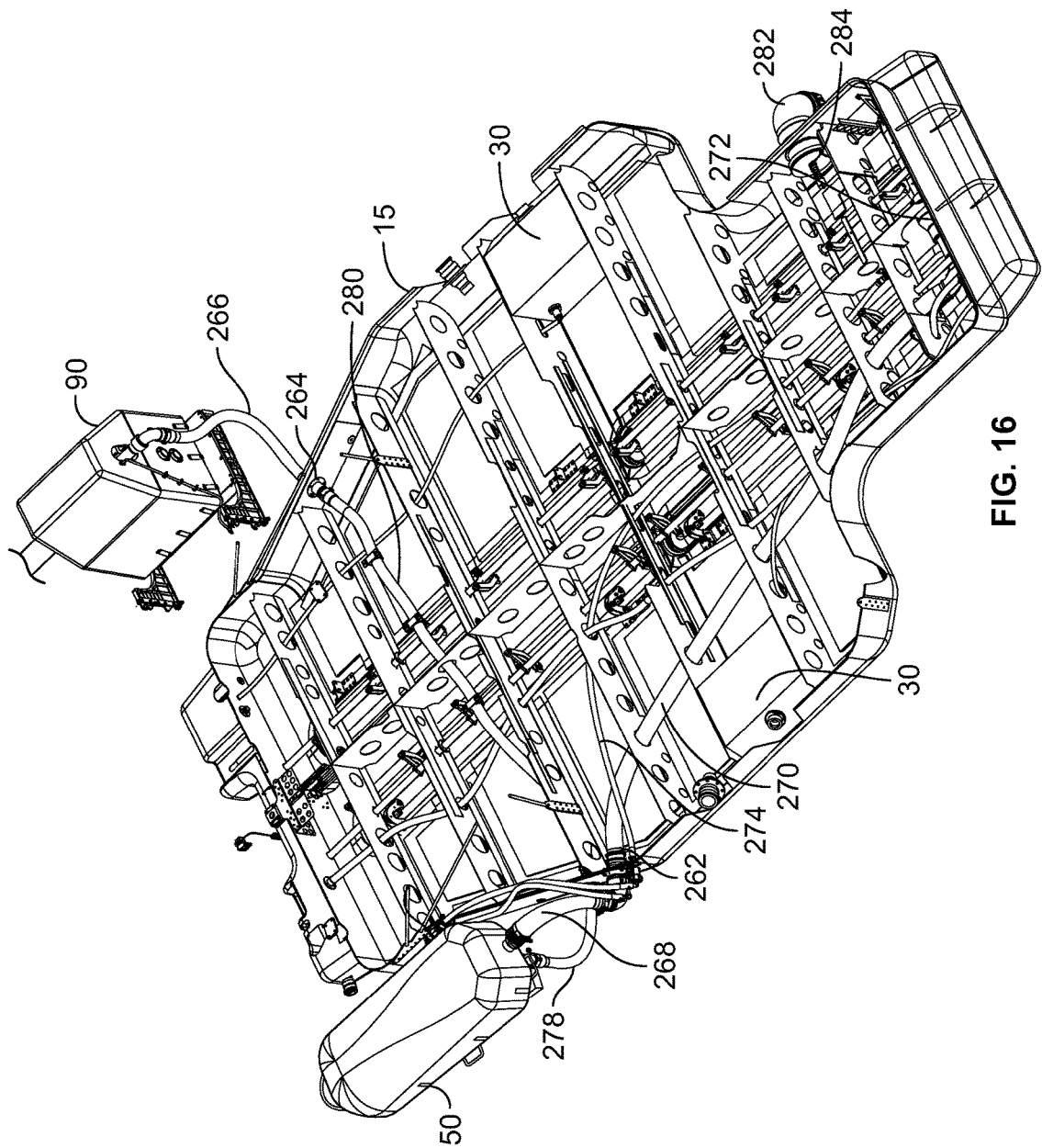
FIG. 16 illustrates a partial front perspective view of tank assembly of the aerial fire suppression system shown in FIGS. 2A and 2B.
Figure 17:
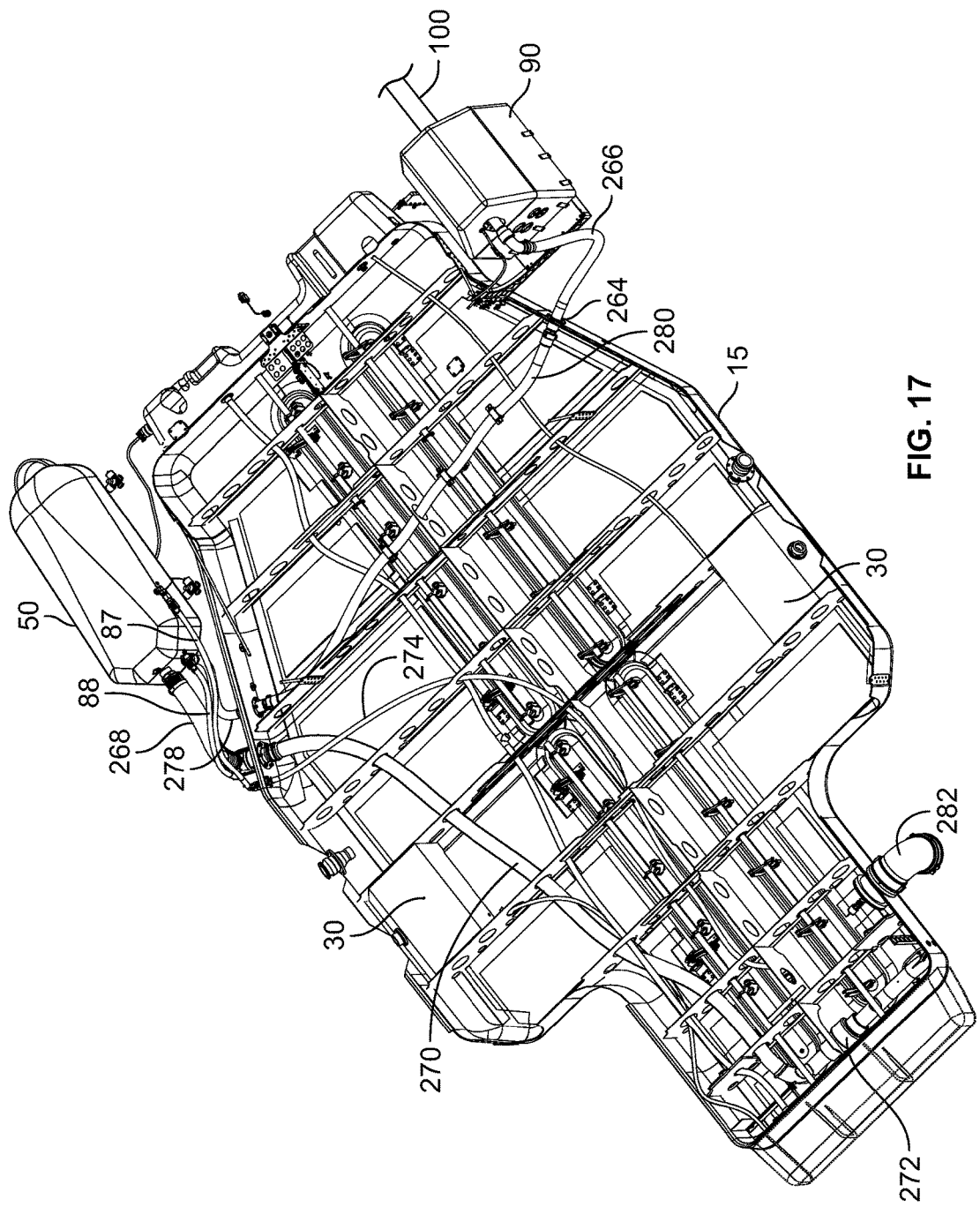
FIG. 17 illustrates another partial front perspective view of tank assembly of the aerial fire suppression system shown in FIGS. 2A and 2B.

Turning to FIG. 14, system 10 may include operator station 240, which is shown as including a group of controls and computer displays. The operator may manipulate the aim point of boom 100 using, for example, a joystick 250. Joystick 250 is electrically connected to linear actuator 212 and rotary actuator 214 to provide horizontal, vertical, and diagonal movement of turret 110. Operator station 240 and/or joystick 250 also include a number of controls to activate or deactivate various aspects of system 10. For example, operator station 240 and/or joystick 250 may include one or more triggers, switches or buttons connected to one or more valves or solenoids to turn on, turn off, or vary the flow of water 24, water/foam solution 38, primer pump 68 operation, and pressurized water/foam/air solution 74 delivered by boom 100 toward a target. Operator station 240 and/or joystick 250 may also include a switch or trigger connected to a solenoid for releasing turret 110 from a locked and/or stowed position. Joystick 250 further include a switch or trigger for opening or closing air induction valve 70. One of ordinary skill would appreciate that other means for turning on or turning off various aspects of system 10 may be used other than buttons, switches, and the like, such as a software-driven user interface deployed on a touch screen, as described below.

Operator station 240 also includes controls to permit an operator to, for example, turn on, turn off, or vary the flow of foam from the one or more foam tanks 30 to water tank 20 via the one or more foam pumps 32. Operator station 240 may also have controls for varying the concentration of foam or foam concentrate to achieve a desired concentration of foam in water tank 20.

Operator station 240 may include one or more displays for displaying information and for providing an interface for an operator to control one or more aspects of system 10. By way of example, displays 258 may report data from infrared vision apparatus 115, distance measuring apparatus 120, position and movement data of boom 100, flow rate, quantities, and quantity remaining of consumable fluids, data regarding the computed time remaining on-station, alert information including data and/or messages indicating one or more operating parameters of cannon assembly 90 falling outside pre-determined limits, data related to atmospheric conditions such as wind direction and speed, temperature, humidity, and barometric pressure, and data relating to altitude, attitude and other performance parameters of the aerial vehicle itself.

Displays 258 may also provide or incorporate a user interface for receiving operator commands regarding the operation of system 10. For example, displays 258 may be configured with a touch sensitive screen for receiving operator input to control or monitor one or more aspects of system 10. Displays 258 may be connected to one or more CPU's, memory, data buses, and software configured to respond to and/or carry out the operator's commands.

System 10 may additionally be configured for remote monitoring or operation of one or more aspects of system 10, such as boom 100. For example, system 10 may be configured to transmit and receive wireless data signals in real-time via satellite, cellular, or W-Fi, for example, including any or all of the information displayable on displays 258 to a remote operator or monitor located on the ground or in the air.

System 10 may include piping for communication of fluids to and from various elements of system 10, valves, including pressure relief valves, temperature, pressure, and position sensors, flow meters, and controllers. System 10 may include other, similar elements without departing from the scope or principles of the instant disclosure.

Turning again to FIGS. 2A-2B, there is shown an exemplary integration of system 10 with a helicopter 150. Tank assembly 15 of system 10 is shown mounted externally to helicopter 150 along the underside of the fuselage. Cannon assembly 90 with turret 110 and boom 100 is shown with boom 100 in the stowed position along the starboard side of helicopter, with nozzle 130 of boom 100 pointed in the direction of the nose of helicopter 150. Powerpack 50 is shown mounted to the port side of helicopter 150, opposite cannon assembly 90 to counterbalance the weight of cannon assembly 90. System 10 is positioned aft of the nose of helicopter 150 at or near the helicopter's center of gravity. System 10 is configured to optimize the flying characteristics of helicopter 150 with system 10 attached thereto and throughout the operation of system 10 and helicopter 150.

In the embodiment shown in the figures, cannon assembly 90 is mounted to and supported on one side of the fuselage of the helicopter 150 while powerpack 50 is mounted to and supported on an opposite side of the fuselage of the helicopter 150. In this way, the weight of cannon assembly 90 may be counterbalanced by the weight of powerpack 50. To connect cannon assembly 90 and powerpack 50 to respective sides of the fuselage of the helicopter 150, system 10 may include cannon assembly interface mount plate 160 and powerpack interface mount plate 170.

As shown in FIGS. 2A to 12, cannon assembly interface mount plate 160 and powerpack interface mount plate 170 are configured to attach to hardpoints 190 that are available on the helicopter 150. These hardpoints 190 are provided by the helicopter manufacturer as standard interfaces to convey externally mounted loads to internal load carrying structures of the aircraft. Thus, adapting system 10 to mount to existing hardpoints 190 via cannon assembly interface mount plate 160 and powerpack interface mount plate 170 provides ease of installation and other cost savings.

FIGS. 3-7 show an exemplary powerpack interface mount plate 170 and related mounting system in greater detail. For example, powerpack interface mount plate 170 may include a pair of upper clevis/pin joints 183 and a plurality of adjustable length connecting members 180 having clevis/pin joints 182 on either end for connecting powerpack interface mount plate 170 to a plurality of aircraft hardpoints 190. In this embodiment, a pair of adjustable length connecting members 180 may be used to connect powerpack interface mount plate 170 to each of two lower aircraft hardpoints 190, and a pair of upper clevis/pin joints 183 may be used to directly connect powerpack interface mount plate 170 to each of two upper aircraft hardpoints 190. The pair of connecting members 180 may be positioned on respective lower corners of powerpack interface mount plate 170 to enable the position of powerpack 50 to be adjusted relative to the position of the aircraft fuselage.

Powerpack 50 of system 10 includes base 176, which in turn, is supported by supports 177,178 (see, e.g., FIG. 5) for supporting and mounting powerpack 50 to the airframe of helicopter 150. Supports 177,178 may be configured with upper and lower hooks 184 and lock pins 185 for quickly connecting and securing supports 177,178 to respective upper and lower pin mounts 186 of powerpack interface mount plate 170. Consequently, once powerpack interface mount plate 170 is secured to the airframe of the helicopter 150, powerpack 50 comprising supports 177,178 pre-mounted to base 176 may be jacked or hoisted in proximity to powerpack interface mount plate 170 where supports 177,178 may be quickly and easily hooked onto and secured to powerpack interface mount plate 170.

FIGS. 8-12 show an exemplary cannon assembly interface mount plate 160 and related mounting system in greater detail. For example, cannon assembly interface mount plate 160 may include a pair of upper clevis/pin joints 165 and a plurality of adjustable length connecting members 162 having clevis/pin joints 164 on either end for connecting cannon assembly interface mount plate 160 to a plurality of aircraft hardpoints 190. In this embodiment, a pair of adjustable length connecting members 162 may be used to connect cannon assembly interface mount plate 160 to each of two lower aircraft hardpoints 190, and a pair of upper clevis/pin joints 165 may be used to directly connect cannon assembly interface mount plate 160 to each of two upper aircraft hardpoints 190. The pair of connecting members 162 may be positioned on respective lower corners of cannon assembly interface mount plate 160 to enable the position of cannon assembly 90 to be adjusted relative to the position of the aircraft fuselage.

Cannon assembly 90 of system 10 includes base 225, which in turn, is supported by supports 227,228 (see, e.g., FIG. 10) for supporting and mounting powerpack 50 to the airframe of helicopter 150. Supports 227,228 may be configured with upper and lower hooks 166 and lock pins 167 for quickly connecting and securing supports 227,228 to respective upper and lower pin mounts 168 of cannon assembly interface mount plate 160. Consequently, once cannon assembly interface mount plate 160 is secured to the airframe of the helicopter 150, cannon assembly 90 comprising supports 227,228 pre-mounted to base 225 may be jacked or hoisted in proximity to cannon assembly interface mount plate 160 where supports 227,228 may be quickly and easily hooked onto and secured to cannon assembly interface mount plate 160.

System 10 may be configured to deliver the pressurized fire retardant comprising the pressurized water/foam/air solution 74 from nozzle 130 at relatively low pressure but at relatively high volumes to suppress a fire downrange. The pressure for low pressure configurations of system 10 may range from approximately 50 to approximately 200 pounds per square inch (psi), depending on how far downrange the water/foam mixture or other fluid is desired to be delivered. In one embodiment, system 10 is configured to deliver the water/foam mixture from nozzle 130 at approximately 125 psi at a flow rate of approximately 150 gpm to a distance of approximately 132 feet from nozzle 130, which corresponds to approximately 150 feet from the proximal end of boom 100 if boom 100 is approximately 7 meters long. In this way, system 10 may be used to suppress fires at a significant distance from the firefighting platform, including buildings located in urban areas, such as high rise buildings and warehouses. In another one embodiment, system 10 is configured to deliver the water/foam mixture from nozzle 130 at approximately 125 psi at a flow rate of approximately 20 gpm to a distance of approximately 65 feet from nozzle 130.

System 10 may alternatively be configured to provide relatively low volumes of fluid at relatively high pressure to, for example, be used for pinpoint cleaning of insulators on electrical high tension wire towers, for cleaning windmills and the like, or for deicing structures, vehicles and the like. In one embodiment, system 10 may be configured for cleaning of high tension wire insulators to deliver a fluid from nozzle 130 at approximately 1500 psi to provide approximately 5.5 to approximately 6.0 gpm to a distance of approximately 12 to approximately 14 feet from nozzle 130, which exceeds the distance currently provided by known cleaning systems of approximately 3 to approximately 6 feet from a nozzle.

An operator, whether it is the pilot, an onboard operator, or a remotely located operator connected to the aerial vehicle via one or more wireless communication protocols, such as for example, cellular, satellite, Wi-Fi, or closed wireless network, may manipulate the aim point of boom 100 using, for example, a joy stick. In another embodiment, the operator may manipulate the aim point of boom 100. Boom 100 may be connected to turret 110, which may or may not include a drive system for altogether moving or at least assisting the movement of boom 100 as directed by an operator. Turret 110 may additionally be configured to stow boom 100 in a "home position" when not in use to enhance the safe operation of the aerial vehicle during flight operations and to permit, for example, easy and safe ingress and egress to and from the location of the fire.

Linear and rotary actuators may be programmed to control the direction and speed of movement of boom 100 and turret 110, respectively, via the joy stick or other steering apparatus. Compound (diagonal) movement of boom 100 may be achieved by engaging the linear and rotary actuators simultaneously, perhaps at different rates. In one embodiment, rotational movement of boom 100 may range from pointing approximately toward the nose of the aerial vehicle (i.e., forward) for stowage during transit of the aerial vehicle, to approximately 110 degrees aft during fire suppression operations. In an embodiment for rotorcraft implementations, vertical movement of boom 100 may range from approximately level (to avoid interference with the rotor) to approximately 40 degrees downward. For aircraft implementations, vertical motion of boom 100 may range from approximately horizontally to approximately 40 degrees downward. A mechanical or an electromechanical lock may be implemented to stow boom 100 for stowage for transit of the vehicle. One or more position sensors may be employed to provide one or more signals corresponding to the position of boom 100. The one or more signals may be used to disengage or engage one or more of the linear and rotary actuators, and thereby movement, of boom 100.

In one or more embodiments, system 10 may include infrared vision apparatus 115, distance measuring apparatus 120 comprising a laser for determining the distance between the aerial vehicle and any obstructions or buildings, and an anti-cavitation device in water tank 20 for minimizing the chances of drawing air rather than water 24 from water tank 20 by main water/foam pump 62. Infrared vision apparatus 115 may comprise infrared camera 117, such as the EVS3 9 Hz infrared camera available from FLIR Systems, Inc. of Goleta, Calif. 93117,to help identify fire hot spots through fog, dust, and smoke and in total darkness. In one embodiment, as shown in FIG. 15, infrared camera 117 may be mounted on boom 100. In another embodiment, infrared camera 117 may be mounted elsewhere on a component of system 10 or on a component of the aerial vehicle. In one embodiment, imagery from one or a multiple of infrared cameras 117 may be fed to display 162 mounted on or near turret 110 to be viewed by an operator of turret 110. Alternatively, imagery from one or a multiple of infrared cameras 117 of system 10 may be fed to multiple displays in real-time. Such displays may include a display in the cockpit for the pilot, a display on a helmet mounted vision system worn by the pilot or by one or more crew members or operators of system 10 onboard the aerial vehicle, a display located remotely from the aerial vehicle either on the ground or in another aerial vehicle, and a display associated with any number of handheld devices, including cellular phones or computer tablet devices.

Using the one or more foam pumps 32, as directed by the operator using, for example, one of the controls discussed above at operator station 240, foam or foam concentrate of a known amount is drawn from the one or more foam tanks 30 and added to a known amount of water in water tank 20 to create a water/foam batch mixture having a desired concentration of foam to water ranging from approximately 1% to approximately 10%.

In a configuration of system 10, the one or more foam tanks 30 comprises approximately 5% to approximately 10% by volume of the amount of water carried in water tank 20. As described above for system 10, the foam to water ratio of system 10 may range from a wet foam to a dry foam of approximately 0.1% to approximately 10.0%, as directed by an operator of system 10. The foam to water ratio of system 10 may alternatively range from approximately 0.4% to approximately 1.0%.

Electrical power to operate system 10 or any portion thereof, including turret 110 and boom 100, electric motor 64, primer pump 68, air induction valve 70, solenoid valve 86, and the like may be derived from a nonessential electrical bus of the aerial vehicle, from an electrical generator connected to the engine or transmission of the aerial vehicle, or from an auxiliary power unit (APU).

All of the fluid pumps described above may be electrically driven using electrical power from the sources noted above, or may be mechanically driven through mechanical links to onboard engines. For example, main water/foam pump 62, the one or more foam pumps 32, and primer pump 68 may be powered either mechanically or electrically from the aircraft or rotorcraft systems. In one embodiment, each or any one of main water/foam pump 62, the one or more foam pumps 32, and primer pump 68 may be configured as an electrically driven pump that draws electrical current from a nonessential main electrical bus of the aircraft or rotorcraft, or from a generator connected either to the rotor or engine system, or from a separate auxiliary power unit (APU).

System 10 may be configured to include a system for replenishing the water supply in water tank 20 while the aerial vehicle is in flight. For example, system 10 may include retractable or nonretractable refill systems configured for use on or with rotorcraft or fixed wing aircraft. In one embodiment, system 10 may include a hover pump system including a water pump at the distal end of a conduit that is of sufficient length to reach a reservoir, lake, or other water source below the aerial vehicle to pump water from the water source to water tank 20.

System 10 may alternatively be configured to include a retractable pump system for deploying and retracting a collapsible, flexible hose to draw water from a water source, such as a pond or lake, into water tank 20 while the aerial vehicle is hovering over the water source. In one embodiment, a retractable pump system may include a housing or structure for supporting a motorized reel and a reversible motor and a motor controller for deploying or retracting a collapsible hose from or onto the reel. The housing may include panels fastened to cage elements to form the structure of the housing. On the distal end of the collapsible hose may be positioned a water pump, the inlet of which may be covered by a screen, for pumping water from the water source to water tank 20. A retractable pump system may be mounted to the aerial vehicle or to a side of tank assembly 15 to conduct water from the collapsible hose to water tank 20 via conduit 282. In either case, a check valve 284 may be positioned at the proximal end of the conduit 282 to minimize water leakage from water tank 20 of tank assembly 15.

A retractable pump system may be controllable from a pilot of the aerial vehicle or from an operator located at operator station 240. During operation, the reversible motor of the retractable pump system may be commanded by the operator, which command is received by a motor controller, which in turn, energizes the reversible motor to cause rotation of the reel in the desired direction to either wind and retract, or unwind and deploy, the collapsible hose to or from the reel. Once the distally-positioned pump is submerged in a water source following deployment of the collapsible hose from the reel, the operator may turn the pump "on" to pump water from the water source to water tank 20 via the collapsible hose, internally through the hub of the reel, and via conduit 282. Conduit 282 may alternatively be adapted to connect with additional plumbing, which in turn, is connected to water tank 20 to communicate the water to water tank 20. Upon completion of the filling cycle, the operator may command the pump to its "off" position to cease pumping water. The operator may then command the reversible motor to cause counter-rotation of the reel to retract the collapsible hose and to wind the collapsible hose onto the reel. Deployment and retraction of the collapsible hose may be initiated while the aerial vehicle is hovering, or in transition to and from hover, respectively, over the water source. One or more of the steps of deploying the collapsible hose to, for example, a predetermined length, turning on and off the pump for pumping of water, and retracting the collapsible hose may be automatically performed using sensors and/or appropriate software control algorithms incorporated into system 10. When the collapsible hose is fully wound on the reel, the retractable pump system may be configured to avoid interfering with normal landing operations for the aerial vehicle.

In an embodiment including a rotorcraft, refill cycle times using either the retractable or nonretractable systems described above while hovering over a water source, such as a reservoir or a lake, may range from approximately 25 seconds to approximately 60 seconds to reload water tank 20 with water. In an embodiment, foam refilling may be required after approximately 5 to approximately 10 water cycles depending upon the ratio of foam to water used.

While specific embodiments have been described in detail, it will be appreciated by those skilled in the art that various modifications and alternatives to those details could be developed in light of the overall teachings of the disclosure. Accordingly, the disclosure herein is meant to be illustrative only and not limiting as to its scope and should be given the full breadth of the appended claims and any equivalents thereof.

What is claimed is:

1. A fire suppression apparatus for fighting fires from a helicopter, comprising:
   a tank assembly configured for attachment to an underside of the helicopter, comprising
      a foam tank for housing a foam,
      a water tank located downstream of the foam tank for housing water, wherein the water tank is configured to receive the foam from the foam tank that when mixed with water in the water tank forms a liquid fire retardant in the water tank, and
      a tank assembly housing that encloses the foam tank and the water tank;
   a powerpack configured for attachment to a side of the helicopter, comprising
      a liquid fire retardant pump configured to pump the liquid fire retardant comprising the foam and water, the liquid fire retardant pump driven by a first electric motor, the liquid fire retardant pump including a pump inlet and an air induction valve positioned at the pump inlet, the air induction valve including an electrically variable valve opening, wherein air and the liquid fire retardant are drawn together into the pump inlet and pressurized by the liquid fire retardant pump to form a pressurized water/foam/air fire retardant solution;
      a liquid primer pump driven by a second electric motor, the liquid primer pump configured to prime the pump inlet with the liquid fire retardant from the water tank;

an inverter connected to the first electric motor, the inverter configured to slowly and controllably start the first electric motor to minimize startup current draw by the first electric motor;

a cannon assembly configured for attachment to an opposite side of the helicopter, comprising an aimable boom connected to the liquid fire retardant pump by a conduit, the boom including a nozzle on a distal end of the boom from which the pressurized water/foam/air fire retardant solution is dispensed toward a target, wherein the powerpack and the cannon assembly are each supported by a pair of brackets cantileverly extending from respective vertical mount plates that are each attachable on opposite sides of a fuselage of the helicopter, and wherein each vertical mount plate is configured to attach to structural hardpoints located on an exterior surface of the helicopter; and including a pair of adjustable length connecting members including a clevis on each opposing end of the connecting members for directly attaching each vertical mount plate to a pair of structural hardpoints of the helicopter.

2. The fire suppression apparatus of claim 1, wherein the liquid fire retardant pump and the liquid primer pump are each supported on a flat upper surface of a horizontal base.

3. The fire suppression apparatus of claim 1, including a ball valve positioned downstream and adjacent a discharge opening of the liquid fire retardant pump.

4. The fire suppression apparatus of claim 1, wherein a primer pump discharge conduit connects a primer pump discharge outlet with a suction conduit positioned upstream of the pump inlet of the liquid fire retardant pump to fill the suction conduit with the liquid fire retardant from the water tank before the first electric motor is commanded to rotate.

5. The fire suppression apparatus of claim 1, including a conduit extending from an inlet of the primer pump to a sump area of the water tank.

6. The fire suppression apparatus of claim 1, wherein the boom includes a carbon fiber composite impregnated with copper mesh.

7. The fire suppression apparatus of claim 6, wherein the boom includes an outboard boom portion, an inboard boom portion, a coupler portion, wherein the coupler portion joins the inboard boom portion to the outboard boom portion.

8. The fire suppression apparatus of claim 7, wherein the coupler portion includes an outer collar, a spring, and a receiver.

9. The fire suppression apparatus of claim 8, wherein the outer collar engages with an annular groove of the receiver, and wherein the spring is in compression when the coupler portion is connected to the inboard boom portion and to the outboard boom portion.

10. The fire suppression apparatus of claim 1, wherein the air induction valve includes an inlet that directly receives unpressurized ambient air.

11. The fire suppression apparatus of claim 1, including one or more electronic controllers in operative communication with the first electric motor and the air induction valve, wherein the one or more electronic controllers are configured to automatically open the air induction valve upon activation of the liquid fire retardant pump.

12. The fire suppression apparatus of claim 1, including a foam pump configured to pump the foam from the foam tank to the water tank, wherein the tank assembly housing encases the foam pump.

13. The fire suppression apparatus of claim 1, wherein the foam tank and the water tank each have an interior volume for holding fluid and the interior volume of the foam tank is five to ten percent of the interior volume of the water tank.

14. The fire suppression apparatus of claim 1, wherein the inverter provides electrical current to the first electric motor linearly from zero amps to approximately 65 amps over a period of 2 to 3 seconds.

15. A fire suppression apparatus for fighting fires from a helicopter, comprising:

a tank assembly configured for attachment to an underside of the helicopter, comprising a tank assembly housing defining an enclosure for holding water, at least one foam tank for holding a foam, the at least one foam tank positioned inside the enclosure, the at least one foam tank displacing the water held by the enclosure, wherein the enclosure is configured to receive at least a portion of the foam from the at least one foam tank that when mixed with the water in the enclosure forms a liquid fire retardant in the enclosure;

a powerpack configured for attachment to a fuselage of the helicopter, comprising a liquid fire retardant pump configured to pump from the enclosure the liquid fire retardant, the liquid fire retardant pump driven by a first electric motor, the liquid fire retardant pump including a pump inlet and an air induction valve positioned at the pump inlet, the air induction valve including an electrically variable valve opening, wherein air and the liquid fire retardant are drawn together into the pump inlet and pressurized by the liquid fire retardant pump to form a pressurized water/foam/air fire retardant solution, a liquid primer pump driven by a second electric motor, the liquid primer pump configured to prime the pump inlet with the liquid fire retardant from the enclosure, and an inverter connected to the first electric motor, the inverter configured to slowly and controllably start the first electric motor to minimize startup current draw by the first electric motor;

a cannon assembly configured for attachment to an opposite side of the helicopter, comprising an aimable boom connected to the liquid fire retardant pump by a conduit, the boom including a nozzle on a distal end of the boom from which the pressurized water/foam/air fire retardant solution is dispensed toward a target, and wherein the powerpack and the cannon assembly are each supported by a pair of brackets cantileverly extending from respective vertical mount plates that are each attachable on opposite sides of the fuselage of the helicopter, and wherein each vertical mount plate is configured to attach to structural hardpoints located on an exterior surface of the helicopter; and including a pair of adjustable length connecting members including a clevis on each opposing end of the connecting members for directly attaching each vertical mount plate to a pair of structural hardpoints of the helicopter.

16. A fire suppression apparatus for fighting fires from a helicopter, comprising:

a tank assembly configured for attachment to an underside of the helicopter, comprising a foam tank for housing a foam,
a water tank located downstream of the foam tank for housing water, wherein the water tank is configured to receive the foam from the foam tank that when mixed with water in the water tank forms a liquid fire retardant in the water tank, and
a tank assembly housing that encloses the foam tank and the water tank;
a powerpack configured for attachment to a side of the helicopter, comprising
a liquid fire retardant pump configured to pump the liquid fire retardant comprising the foam and water, the liquid fire retardant pump driven by a first electric motor, the liquid fire retardant pump including a pump inlet and an air induction valve positioned at the pump inlet, the air induction valve including an electrically variable valve opening, wherein air and the liquid fire retardant are drawn together into the pump inlet and pressurized by the liquid fire retardant pump to form a pressurized water/foam/air fire retardant solution;
a liquid primer pump driven by a second electric motor, the liquid primer pump configured to prime the pump inlet with the liquid fire retardant from the water tank;
an inverter connected to the first electric motor, the inverter configured to slowly and controllably start the first electric motor to minimize startup current draw by the first electric motor; and
a cannon assembly configured for attachment to an opposite side of the helicopter, comprising
an aimable boom connected to the liquid fire retardant pump by a conduit, the boom including a nozzle on a distal end of the boom from which the pressurized water/foam/air fire retardant solution is dispensed toward a target,
wherein the boom includes a carbon fiber composite impregnated with copper mesh, wherein the boom includes an outboard boom portion, an inboard boom portion, a coupler portion, wherein the coupler portion joins the inboard boom portion to the outboard boom portion, and wherein the coupler portion includes an outer collar, a spring, and a receiver.

17. The fire suppression apparatus of claim 16, wherein the outer collar engages with an annular groove of the receiver, and wherein the spring is in compression when the coupler portion is connected to the inboard boom portion and to the outboard boom portion.

\* \* \* \* \*

UNITED STATES PATENT AND TRADEMARK OFFICE
CERTIFICATE OF CORRECTION

PATENT NO. : 10,406,390 B2
APPLICATION NO. : 15/232609
DATED : September 10, 2019
INVENTOR(S) : Mark D. Zimmerman et al.

It is certified that error appears in the above-identified patent and that said Letters Patent is hereby corrected as shown below:

In the Specification

Column 11, Line 47, "W-Fi" should be changed to --Wi-Fi--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*